(12) United States Patent
Harmon et al.

(10) Patent No.: US 6,170,768 B1
(45) Date of Patent: Jan. 9, 2001

(54) PNEUMATIC ACCELERATOR FOR MULTI-PHASE MATERIAL ACCELERATION DISPERSION AND CONVEYANCE

(75) Inventors: L. Kent Harmon, Provo; Christopher B. Harris, Sandy; Leonard R. Howe, Payson, all of UT (US)

(73) Assignee: Terra Systems, Inc., Payson, UT (US)

( * ) Notice: Under 35 U.S.C. 154(b), the term of this patent shall be extended for 0 days.

(21) Appl. No.: 09/267,530

(22) Filed: Mar. 12, 1999

Related U.S. Application Data

(60) Provisional application No. 60/077,865, filed on Mar. 13, 1998.

(51) Int. Cl.[7] .................................................. B02C 19/00
(52) U.S. Cl. .................................. 241/5; 241/39; 406/194
(58) Field of Search ................................ 406/194, 92, 94, 406/61, 60, 130, 55; 241/5, 39, 40

(56) References Cited

U.S. PATENT DOCUMENTS

| 628,187 | 7/1899 | Sibley . |
|---|---|---|
| 3,602,552 | 8/1971 | Morgan . |
| 3,975,058 | 8/1976 | York . |
| 4,009,912 | 3/1977 | Mraz . |
| 4,145,453 | 3/1979 | Lenhardt, Sr. . |
| 4,186,772 | * 2/1980 | Handleman ............................. 241/39 |
| 4,283,015 | 8/1981 | Smith . |
| 4,502,819 | 3/1985 | Fujii et al. . |
| 4,711,607 | 12/1987 | Wynosky et al. . |
| 4,764,058 | 8/1988 | Jones et al. . |
| 4,776,731 | 10/1988 | Briggs et al. . |
| 4,851,110 | 7/1989 | Rolle et al. . |
| 4,930,707 | 6/1990 | Oshiro et al. . |
| 5,232,314 | 8/1993 | Hopkins . |
| 5,718,539 | 2/1998 | Segota . |
| 5,863,155 | 1/1999 | Segota . |

FOREIGN PATENT DOCUMENTS

| 0094811 | 5/1983 | (EP) . |
|---|---|---|
| 0099653 | 6/1983 | (EP) . |

\* cited by examiner

*Primary Examiner*—Mark Rosenbaum
(74) *Attorney, Agent, or Firm*—Morriss Bateman O'Bryant & Compagni

(57) ABSTRACT

A dilute phase pneumatic materials conveyance apparatus is disclosed having a pneumatic accelerator which is capable of conveying materials through a gas stream which is selectively patterned. The conveyance apparatus also includes a source-gas manifold and control apparatus which enable selective control of the apparatus on a real time basis to achieve desired gas pattern flows through the apparatus to achieve selected particle dispersion, isolation, stratification, electrification, classification and entrainment of material and to convey it through a processing conduit. The configuration of the conveyance apparatus also enables further processing, including drying, sorting, pulverization and classification of the materials. The conveyance apparatus also enables classification of materials based on the aerodynamic diameter of the particles being conveyed because of the ability to achieve particle isolation.

31 Claims, 13 Drawing Sheets

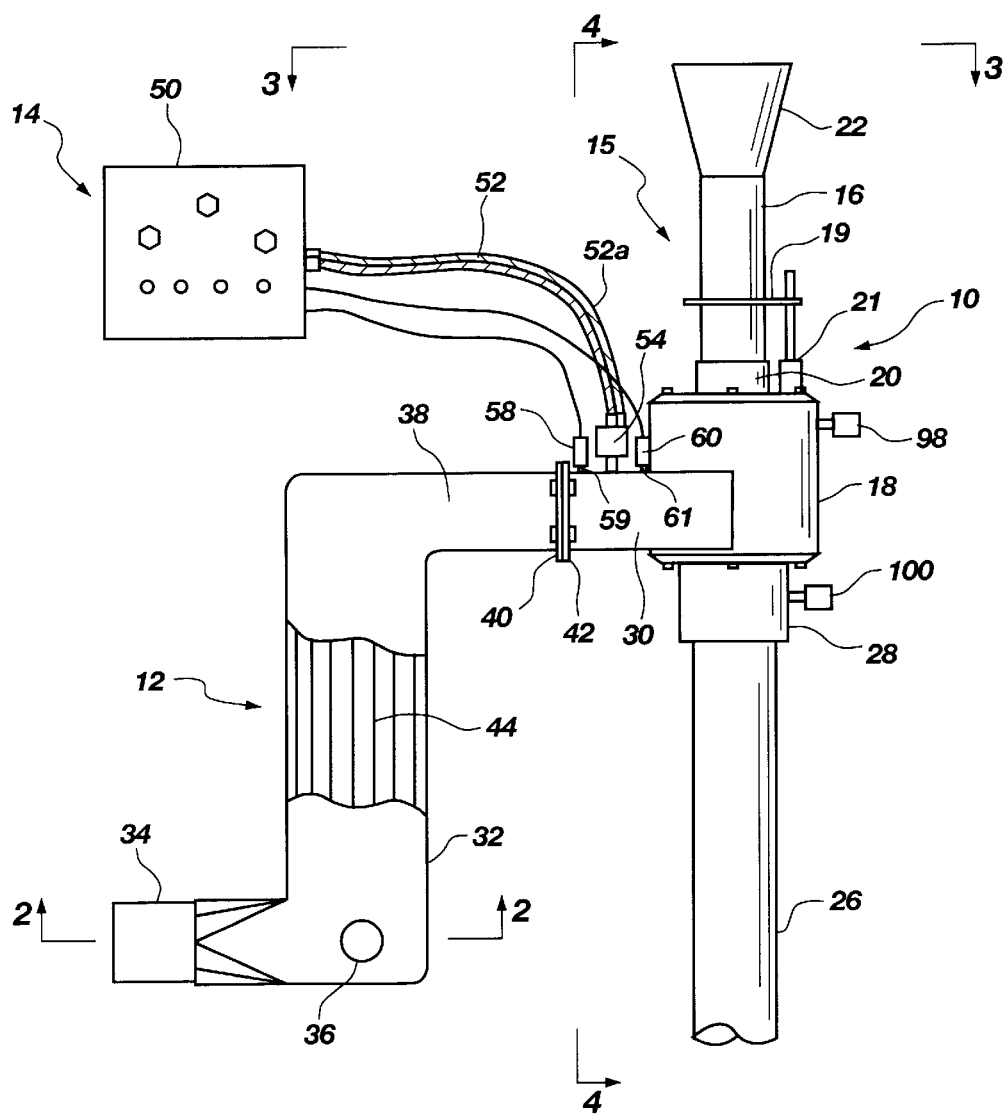
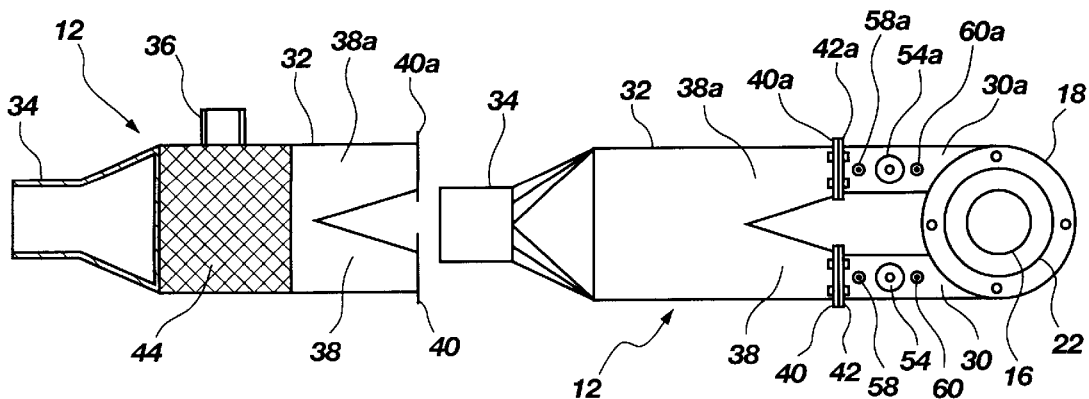
Fig. 1
Fig. 2   Fig. 3

PNEUMATIC ACCELERATOR FOR MULTI-PHASE MATERIAL ACCELERATION DISPERSION AND CONVEYANCE

CROSS-REFERENCE TO RELATED APPLICATION

This application claims priority to provisional application Serial No. 60/077,865 filed Mar. 13, 1998.

BACKGROUND OF THE INVENTION

1. Field of the Invention

The present invention relates to pneumatic accelerator apparatus for processing particulate matter, and specifically relates to a pneumatic accelerator structured to provide controlled acceleration of bulk materials to enable the particles to be selectively dispersed, isolated, stratified, electrified and classified which further enables select conveyance, drying, mixing, classification, crushing and micro-pulverization of such bulk materials.

2. Statement of the Art

Devices configured for entrainment of liquids and/or solids via high volume gas or liquid flow into and through a conduit are known in the art and are used extensively in a wide variety of industries, such as mining, milling and agriculture, and include structural applications ranging from pneumatic materials conveyors to dredging nozzles and air cannons. A structural application particularly relevant to the present invention is dilute phase pneumatic conveyors, which are so named in the industry because they employ solids-to-gas weight ratios below ten.

Typical dilute phase pneumatic conveying devices are described in U.S. Pat. No. 3,602,552 to Morgan, U.S. Pat. No. 3,975,058 to York, U.S. Pat. No. 4,711,607 to Wynosky, et al., U.S. Pat. No. 5,718,539 to Segota and U.S. Pat. No. 5,863,155 to Segota. Such conveying devices are typically comprised of a motor-driven screw or auger conveyor mounted within a tube or barrel and a gravity-fed hopper for supplying particulate material to the auger conveyor through an opening in the barrel. This conventional arrangement is capable of establishing a high velocity air-flow where material ejected by the screw conveyor is subjected to one or more jets of pressurized air. The mixture of material and gas thus formed is propelled by the pressurized gas through a conduit connected to a mixing chamber. Such devices typically require a high volume, relatively low pressure gas supply-employing working pressures of up to 15 psig, as measured at the gas source, to create gas flow conditions sufficient to entrain and convey materials.

Conventional suction dredging, vacuum, and air cannon apparatus, such as that described in U.S. Pat. No. 4,776,731, typically utilize high pressure, low volume air or liquid flow produced by a compressor or high pressure pump to produce vacuum pressure in a conduit. The low volume, high pressure gas or liquid is introduced into a combined intake and conduit via a venturi-like device, such as a nozzle or jet, which is integrally connected with an intake conduit and positioned at an angle so that the flow is directed toward the exhaust end of the conduit, thereby potentially creating a substantial vacuum wherein various substances may be entrained at the intake end and conveyed through the conduit to an exhaust end. Vacuum and air cannon apparatus typically are able to produce supersonic gas flows through the venturis or jets to assist in creation of the suction required to entrain materials, sometimes with vacuum pressures of up to 12 inches of mercury. To establish and maintain this type of gas flow, such integrated systems typically require between 90 to 150 psi working pressures measured at the gas source.

Of particular interest when considering conventional dilute phase pneumatic conveying devices, like the devices described in U.S. Pat. Nos. 3,602,552; 3,975,058; 4,711,607 and U.S. Pat. No. 4,776,731 to Briggs, et al., is the nature of the nozzle that is used to accelerate the air. That is, they all disclose a nozzle with an inner linear contour and a nozzle or venturi configuration which is of the convergent divergent type, meaning that the end of the nozzle converges to a point of transition with a conduit and the conduit is structured with a divergent opening. The convergent/divergent configuration of the nozzle in such devices, coupled with the means for producing gas flow within the device, produces conveyance of materials in typically a rotational flow.

Problems exist with conventional types of dilute phase pneumatic conveyance systems, most of which relate to excessive wear in the apparatus due to the design of the apparatus and due to the ineffectiveness or inefficiencies of the devices. For example, two main types of premature wear are found in conventional pneumatic conveyance devices, namely wear within the feed mechanism (e.g., the auger or screw conveyor and associated components) and wear within the conduit itself. Excessive wear in conventional conveyor apparatus is a natural by-product of materials processing and results in increased costs associated with maintenance of the apparatus due to wear and nonproductive downtime associated with replacement of worn parts. The components affected by wear include the inner feed hopper walls, the screw conveyor and shaft, the shaft seals and bearings, the inner wall of the barrel and areas of the mixing zone.

Wear within the conduit is due to the flow pattern of the accelerated air used to entrain the material in conventional devices. That is, vortical (i.e., rotational) flow patterns are conventionally believed to represent the most efficient conditions for the introduction and entrainment of materials. However, problems occur when centrifugal force acting on the particles entrained within the fluid travel in a circular or helical path. Specifically, centrifugal force can cause larger particles to strike the inner surface of the conduit, thus causing premature wear. Conversely, centrifugal force on smaller particles is not significant and smaller particles travel through the apex of the vortex. But the apex of the vortex is not stable and provides another source of wear because the apex continually changes position as it seeks to find a reference point within the conduit, thus directing material to contact the conduit walls. Further, if an increase in head pressure inside the conduit occurs, usually as a result of increased material saturation or of conduit length, in time the unstable vortex will become inverted. Prolonged time in the inverted state invariably causes the vortex to collapse, resulting in inefficient and inconsistent material feed into the gas stream and potential conduit blockage.

Wynosky and Mraz describe such a vortex-creating apparatus in their previously identified patent. The patented apparatus is substantially comprised of a plenum with a single tangentially aligned gas inlet to introduce pressurized gas to a venturi nozzle, which accelerates the gas flow sufficiently to establish a vortex in the mixing chamber zone of the apparatus. Material is then metered and injected via a screw conveyor feed to the vortex and into the conduit. The tangential positioning of the inlet relative to the plenum dictates the creation of vortical flow out the end of the venturi nozzle with a specific orientation of rotation that cannot be modified.

Blowback is another common problem observed in prior art devices and is created when the level of material entrained within the gas stream and/or the length of conduit causes the pressure in the conduit to exceed a critical level. When the pressure is exceeded, some of the accelerated gas and entrained material are forced to flow back through the feed tube or barrel and out the material feed hopper, thus preventing material feed into the gas stream. As a result, there is a loss of gas flow through the conduit and a corresponding loss in velocity which can cause the conveyed material to drop out of the air-stream and buildup in or plug the inside of the conduit. Blowback can also cause severe dust problems and/or contamination of the materials being processed. Typical solutions to blowback include incorporating mechanical flaps near the barrel opening, tapering the barrel or otherwise modifying the auger conveyor flight to produce a material plug in the end of the conduit, or controlling the material feed via the auger conveyor motor speed to regulate material-to-gas ratios, thereby preventing over-saturation of the material flowing through the product conveying line. Such solutions do not guarantee prevention of blowback, however, because the solutions do not address the fundamental issue of gas flow as a contributing factor to blowback.

Conventional pneumatic conveyance devices are not designed to effectively control or modify the gas flow pattern moving through the system and are, therefore, unable to control the vorticity of the materials and gas moving through the system. As a result, the conveyance device is subjected to premature wear. Further, because conventional conveyance devices cannot effectively control gas flow patterns, conventional devices are not known to be capable of providing anything other than conveyance of materials from one point to another. Such devices are not know to be able to dry, pulverize, sort or classify the materials being conveyed. Another problem exhibited with the conventional devices, such as that disclosed in the Wynosky, et al. patent, is the difficulty in introducing material into the feed hopper in other than a nearly horizontal position, effectively limiting the use of the device to those applications which first transport material horizontally and, perhaps, vertically after the material is accelerated.

Thus, it would be beneficial in the art to provide a high volume, low pressure dilute phase accelerator apparatus in which the gas flow pattern of the device is capable of being controlled and modified to selectively produce multi-phase flow patterns through the device to prevent premature wear in the system, to selectively disperse, isolate, stratify, electrify and classify the particles being conveyed and to facilitate not only conveyance, but drying, pulverization, sorting, classifying and other materials processing. It would also be beneficial to provide a pneumatic conveyor apparatus which is structured to effectively prevent blowback and one which can be mounted or operated in any orientation (e.g., vertically, horizontally or on an angle) to accommodate the widest variety of applications.

SUMMARY OF THE INVENTION

In accordance with the present invention, a pneumatic materials accelerator and conveyance apparatus is configured to produce a selected gas flow pattern at high volume, low pressure to provide controlled conveyance of multi-phase materials, to selectively disperse, isolate, stratify, electrify and classify the particles being conveyed and to enable further processing of such multi-phase materials, including drying, pulverizing, stratifying, sorting and classifying. Because the configuration of the present invention enables a selected and controlled gas flow pattern for entrainment of particulate materials, the conveyance of such particulate matter is also selectively controllable to reduce wear in the apparatus and to reduce the occurrence of undesirable processing conditions, such as blowback.

The pneumatic materials accelerator and conveyance apparatus of the present invention generally comprises a plenum housing in which is positioned a nozzle, a feed mechanism for introducing a material, such as a particulate material, into the selected gas flow pattern produced in the nozzle, gas inlets positioned in the plenum housing for delivering gas to the nozzle in a selected manner to produce a selected and controlled gas flow pattern therein, and a processing conduit for conveying the multi-phase material to an end point. As used herein, "multi-phase" refers to conveyable matter which is comprised of a solid, liquid or gas, or any combination thereof. A source of gas is associated with the plenum housing to provide gas to the gas inlets in a selectively controlled manner. Control apparatus may also be associated with the gas inlets, plenum housing and source of gas to provide such control.

The configuration of the pneumatic materials conveyance apparatus of the present invention enables the establishment of a selectively controlled gas flow pattern, which is initiated at introduction of gas through the gas inlets into the plenum housing, and is substantially established at the point where the nozzle, in proximity to the end point of the feed mechanism, directs the materials-entrained gas flow to the processing conduit. The established gas flow pattern may be either an irrotational (i.e., linear) flow pattern or a rotational flow pattern (i.e. one having a vortex), but in either case, the ability to control the gas flow pattern enables the material to be conveyed at low to negligible static pressures in a distinct, three-region flow pattern comprised of a turbulent core, a laminar boundary layer and an intermediate transition region. The controlled flow pattern reduces the incidence of particulate material contacting or striking the inner wall of the processing conduit, thereby reducing wear on the apparatus.

The present invention more specifically comprises a pneumatic accelerator of which a feed mechanism, including a feed conduit, the plenum housing, nozzle and processing conduit are a part. The feed mechanism of the present invention includes the feed conduit, which is attached to the plenum housing, and may include a structured feed inlet for receiving a bulk material prior to entry into the feed conduit. The feed conduit may either be stationary relative to the plenum housing or may be axially adjustable relative thereto for providing more finite control of the introduction of particulate materials to the gas flow. In some embodiments, the feed mechanism may further include an auger or extruder located in or near the feed conduit to direct particulate materials toward the nozzle within the plenum.

The plenum housing includes one or more gas inlets through which gas is introduced from the manifold. As used herein, the term "gas" is meant to refer to and include both a single gas or a mixture of gases, as described more fully below. The plenum housing is configured to receive and direct the gas in a manner which achieves a high volume, low pressure flow of gas into which the particulate materials becomes entrained. More importantly, the plenum housing and nozzle are configured to achieve and maintain a high velocity/low pressure irrotational (linear) or rotational (nonlinear), three region flow into which the particulate material is introduced and conveyed in dilute phase to the end of the system. The nozzle within the plenum housing is positioned about one end of the feed conduit and is axially aligned therewith. An annular space is provided between the nozzle and the feed conduit through which gas flows. The annular space between the feed conduit and the nozzle may be selectively altered to control the gas flow pattern. Further, the inner wall of the nozzle may be preferably curved, or may be linear, and the configuration of the nozzle may be particularly selected to achieve a desired flow pattern in the conveyance of the materials. The nozzle configuration also enables controlled acceleration, dispersion, electrification, isolation and stratification of the particulate materials prior to the point of entry into the processing conduit. The gas and entrained materials are then conveyed at high velocity and low pressure through the processing conduit to the end of the system.

The conveyed materials may be further processed, such as by phase separation, pulverization, classification and drying. Additional structures may be associated with the pneumatic materials conveyor to enable further processing, such as one or more capture vessels arranged in series or parallel, or a combination of series and parallel. Capture vessels may include a cyclone, baghouse, mixing bin, pulverization chamber, classification chamber, product bin or any other type of device.

The pneumatic materials conveyor of the present invention is principally structured to achieve high volume, low pressure gas flows to achieve the described principles of materials conveyance, but also mimics the abilities of devices which produce high pressure, low volume gas flows to achieve a vacuum pressure for conveyance of materials in that materials can be conveyed more efficiently and over longer distances with the present invention. The ability to achieve and control vacuum pressures in the present invention enables it to operate without blowback. Also, the invention can provide a wide range of gas flow velocities, for accommodating the handling requirements of various materials, by the axial adjustment of the materials feed conduit in relation to the nozzle, while not modifying the volume flow rate from the gas source.

The pneumatic materials conveyor of the present invention has few moving parts (i.e., the feed conduit, nozzle and auger, when used), and is configured to reduce contact between the particulate matter and the apparatus, thereby effectively decreasing the potential for mechanical failure and increasing system productivity. Because the invention uses so few moving parts, it can be set up in any desired direction (e.g. vertical or horizontal), thereby accommodating a wide variety of applications.

BRIEF DESCRIPTION OF THE DRAWINGS

In the drawings, which illustrate what is currently considered to be the best mode for carrying out the invention:

FIG. 1 is a view in elevation of a representation of the pneumatic materials conveyor of the present invention;

FIG. 2 is a view in partial cross section of the source-gas manifold of FIG. 1, taken at line 2—2, showing a diffuser grid in the interior and dual outlets;

FIG. 3 is a plan view of the pneumatic accelerator of FIG. 1, taken at line 3—3;

DETAILED DESCRIPTION OF THE ILLUSTRATIONS

Figure 4:
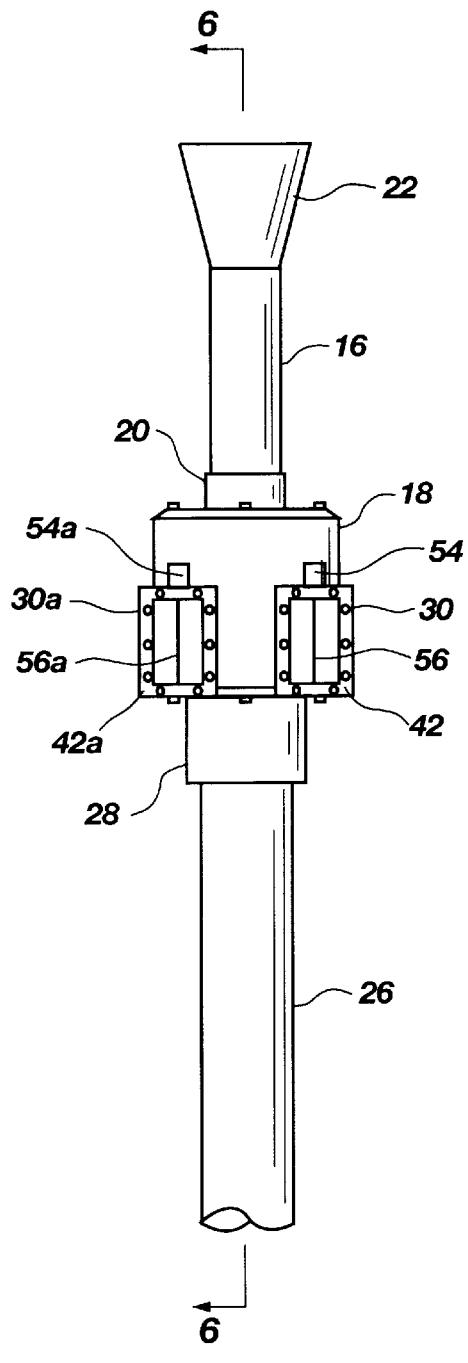
FIG. 4 is a view in elevation of the pneumatic accelerator of FIG. 1, taken at line 4—4.

FIG. 1 illustrates the pneumatic materials conveyor of the present invention, which generally comprises a pneumatic materials accelerator 10, a source gas manifold 12 and control apparatus 14 for controlling the flow of gas to the pneumatic materials accelerator 10. The pneumatic materials accelerator 10 is further comprised of a feed mechanism 15, a plenum housing 18 and a processing conduit 26 through which particulate materials are directed for eventual entrainment with a selectively patterned gas flow for conveyance through the system. Notably, the pneumatic materials conveyor shown in FIG. 1 is vertically oriented such that material entering the pneumatic materials accelerator 10 moves downward through the device. However, the pneumatic accelerator 10 may be positioned in a horizontal orientation or in any angled orientation making it adaptable to both new and retrofit applications. The ability to orient the pneumatic conveyor in any number of orientations renders the invention particularly advantageous over prior devices known in the art, many of which are necessarily limited to operation in one orientation only (usually horizontal).

The feed mechanism 15 functions to direct feed material to the center of a high velocity gas stream formed within the plenum housing 18, as described more fully below. The feed mechanism 15 comprises a feed conduit 16 which is connected to the plenum housing 18 by means of a feed conduit collar 20. The feed conduit 16 may preferably be axially adjustable relative to the plenum housing 18 by any suitable device, such as a movable connector 19 driven by a servo motor 21 operated by the control apparatus 14. The feed mechanism 15 may also include a configured feed inlet 22 through which material is introduced to the feed conduit 16. The feed inlet 22 may have any shape or configuration, but is shown here as being cone-shaped. The feed inlet 22 provides the initial site for mixing particulate materials before the materials enter the system for processing. It should be noted that the embodiment of the invention illustrated in FIGS. 1–6 suggests that feed material is drawn into the pneumatic accelerator 10 by vacuum and by gravity only. However, the feed rate of material may, more specifically, be controlled by the rate at which material is fed to the feed inlet 22 and feed conduit 16 by an appropriate feeder device, such as a bucket elevator, weigh-belt feeder or the like.

A processing conduit 26 is attached to the plenum housing 18 by means of a conduit adapter 28 and is substantially axially aligned with the feed conduit 16. At least two gas inlets 30, 30a (FIG. 3) are attached to the plenum housing 18 to deliver gas into the plenum housing 18 from the source-gas manifold 12, as described more fully below. The plenum housing 18 is shown as being circular in lateral cross section. However, the plenum housing 18 may be any other suitable shape. Further, the gas inlets 30, 30a may be any suitable size or shape in lateral cross section. However, gas inlets which are relatively large in relation to the plenum housing 18 will tend to produce better mixing of the gas than is achieved with smaller gas inlets.

The source-gas manifold 12 includes a manifold housing 32 at one end of which is positioned a manifold inlet 34 for receiving gas from an external source, such as a blower, centrifugal fan, pressurized tank or from some other appropriate source. The gas may even be generated by a chemical reaction of precursor agents. The manifold inlet 34 may, therefore, be shaped, sized or dimensioned in any manner suitable to making a fluid tight connection with the given source of gas. A secondary gas inlet 36 is positioned in the manifold housing 32 in proximity to the manifold inlet 34 to provide an opening through which a secondary gas (e.g., argon, carbon dioxide, nitrogen, etc.) may be introduced in situations where a specific mix of gas is desired. The secondary gas inlet 36 may be any shape, size or dimension necessary for attachment thereto of a secondary gas source (e.g., several adapters may be necessary for more complex gas mixes and may be similarly configured).

The manifold housing 32 is structured with one or more manifold outlets 38, 38a positioned to attach to the plenum housing 18 via the gas inlets 30, 30a thereof. The number of manifold outlets 38, 38a is equal to the number of gas inlets 30, 30a of the plenum housing 18. Each manifold outlet 38, 38a is structured to attach to the gas inlets 30, 30a of the plenum housing 18. By way of example, each manifold outlet 38, 38a may be structured with a manifold outlet flange adapter 40, 40a for securement to a corresponding inlet flange adapter 42, 42a formed as part of the gas inlets 30, 30a, as shown in FIGS. 2 and 3. Other suitable means of connecting the gas inlets 30, 30a to the corresponding manifold outlets 38, 38a may be employed.

A diffuser 44 may be positioned within the manifold housing 32, approximately equidistant between the manifold outlets 38, 38a and the manifold inlet 34, which operates to homogenize the flow of gas moving through the manifold housing 32 toward the manifold outlets 38, 38a. The diffuser 44 helps ensure that the flow of gas is substantially evenly dispersed between the number of manifold outlets 38, 38a, the importance of which is described more fully below.

Referring to FIGS. 1, 3 and 4, the control apparatus 14 of the present invention includes a controller 50 which is in electrical communication, via wiring 52, 52a, with a stepper motor 54, 54a connected, respectively, to valves 56, 56a (FIG. 4) positioned in each gas inlets 30, 30a of the plenum housing 18. The stepper motors 54, 54a operate to selectively open and close the valves 56, 56a to varying degrees to provide a selected amount of gas flow therethrough. The controller 50 is also in electrical communication with a primary flow transducer 58, 58a connected to each gas outlet 30, 30a on the side of the valve 56, 56a which is in proximity to the source-gas manifold 12, and is in electrical communication with a secondary flow transducer 60, 60a connected to each gas inlet 30, 30a on the side of the valve 56, 56a which is in proximity to the plenum housing 18. Each primary flow transducer 58, 58a is connected to its respective gas inlet 30, 30a by a flow transducer adapter 59 and each secondary flow transducer 60, 60a is connected to its respective gas inlets 30, 30a by a flow transducer adapter 61.

The primary flow transducer 58, 58a monitors gas flow as it enters through the valve 56, 56a and the secondary flow transducer 60, 60a monitors gas flow conditions in each associated gas inlet 30, 30a as the gas passes through the valve 56, 56a to the plenum housing 18. A signal is thereby generated by the primary flow transducers 58, 58a and the secondary flow transducers 60, 60a and relayed to the stepper motors 54, 54a to effect a selective opening or closing of the valves 56, 56a responsive to a perceived gas flow condition in each gas inlet 30, 30a. Accordingly, the mass flow of gas through the gas inlets 30, 30a can be finitely controlled to achieve a desired dilute phase gas flow pattern in the plenum housing 18, as described more fully hereinafter.

Figure 5:
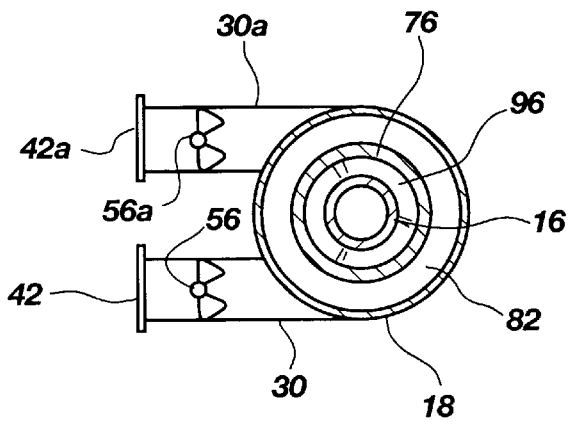
FIG. 5 is a view in lateral cross section of the plenum housing taken at line 5—5 of FIG. 6.

FIGS. 3, 4 and 5 illustrate more fully the structure and positioning of the gas inlets 30, 30a and valves 56, 56a relative to the source-gas manifold 12 and the plenum housing 18. The size, shape, cross-sectional area, and axial and tangential positioning of the gas inlets 30, 30a may vary and may depend on the process for which the invention is to be used. In FIGS. 3 and 5, for example, it can be seen that the gas inlets 30, 30a are preferably positioned tangentially to the plenum housing 18 and in substantially parallel orientation to each other. Tangential positioning of the gas inlets 30, 30a as shown may be particularly preferred where it is desirable to produce an irrotational gas flow pattern, as explained more fully below. Alternatively, however, the gas inlets 30, 30a may be positioned in other than a parallel orientation to each other to selectively achieve rotational gas flow patterns in the plenum housing 18.

While the gas inlets 30, 30a may be positioned in linear opposition to each other, such orientation of the gas inlets 30, 30a results in lessened ability to create the desired and controlled dilute phase flow pattern of gas in the processing conduit 26 which characterizes the uniqueness of the present invention. That is, by tangentially positioning the gas inlets 30, 30a, the flow of material through the processing conduit 26 can be dynamically and selectively controlled (i.e., dispersed, isolated, stratified, electrified and classified) according to a desired processing parameter (e.g., drying, classifying, transporting, pulverizing, agglomeration, etc.) as a function of selectively achieved irrotational or rotational flow. Notably, most processes require an irrotational gas flow while fewer process applications require rotational flow.

Figure 6:
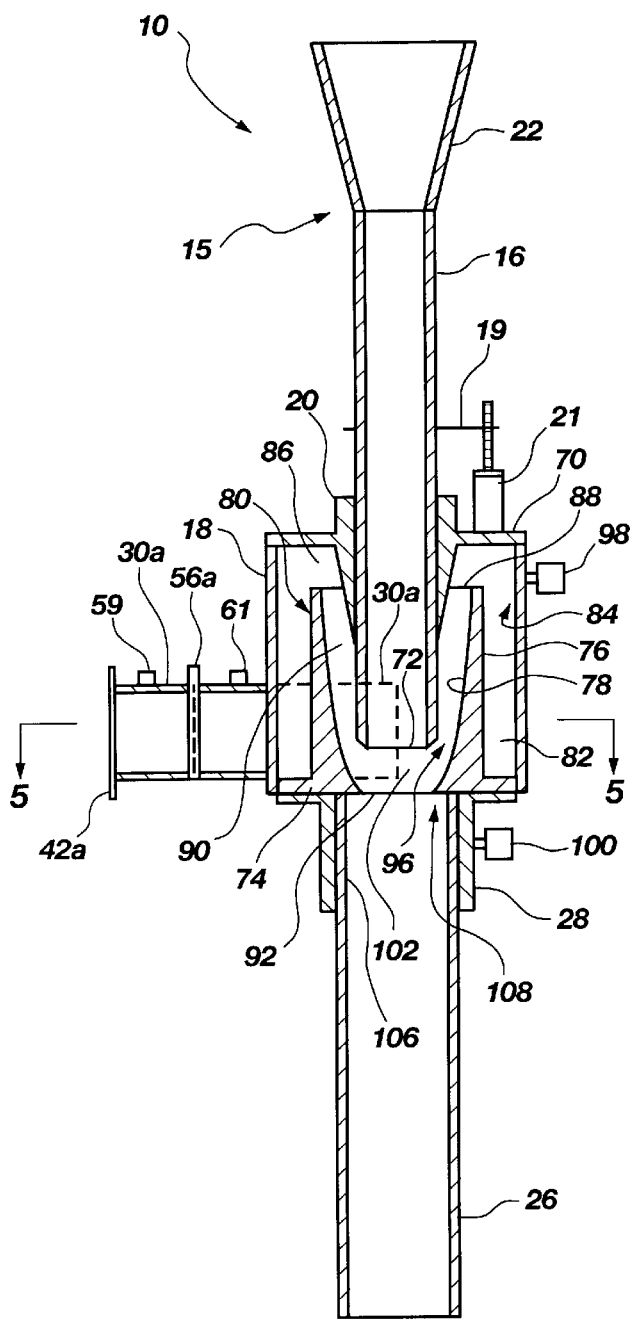
FIG. 6 is a view in cross section of the pneumatic accelerator shown in FIG. 4, taken at line 6—6.

FIG. 6 further illustrates the internal structure of the pneumatic accelerator 10 and provides the best illustration of how the present invention operates. As shown, the feed conduit 16 is configured as a hollow tube which extends through the rear wall 70 of the plenum housing 18. A terminal end 72 of the feed conduit 16 extends through the plenum housing 18 toward the front wall 74 of the plenum housing 18. The feed conduit 16 is coaxially aligned with the processing conduit 26, which is attached to and extends from the front wall 74 of the plenum housing 18. The plenum housing 18 provides an external structure for enclosing a three-dimensional nozzle 76 which is positioned toward the front wall 74 thereof. In this embodiment, the nozzle 76 is attached to the front wall 74 of the plenum housing 18, although it may be secured to the plenum housing 18 in an alternative manner and may be axially adjustable relative to the plenum housing 18. The nozzle 76 is coaxially aligned with the feed conduit 16, the terminal end 72 of which is positioned within and surrounded by the nozzle 76. The nozzle 76 is also coaxially aligned with the processing conduit 26.

The nozzle 76 is structured with an inner wall 78 which is oriented toward and spaced from the feed conduit 16 and an outer wall 80 which is oriented toward and spaced from the inside wall 84 of the plenum housing 18. The nozzle 76 is sized to be received in the plenum housing 18 so that an annular space 82 exists between the outer wall 80 of the nozzle 76 and the inner wall 84 of the plenum housing 18, and so that an end space 86 exists between the first end opening 88 of the nozzle 76 and the rear wall 70 of the plenum housing 18. The gas inlets 30, 30a are generally positioned toward the front wall 74 of the plenum housing 18 and are positioned to deliver a flow of gas into the annular space 82. As described more fully below, gas flow moves from the annular space 82 to the end space 86, and then into the interior 90 of the nozzle 76.

The inner wall 78 of the nozzle 76 extends from the first end opening 88 of the nozzle 76 to the second end opening 92 of the nozzle 76, which is positioned toward the front wall 74 of the plenum housing 18. The diameter of the first end opening 88 of the nozzle 76 may preferably be greater than the diameter of the second end opening 92 of the nozzle 76 so that the inner wall 78 slopes radially inwardly toward the second end opening 92. The slope of the inner wall 78 of the nozzle 76 may be linear, as illustrated in FIG. 7a, or may be curved from the first end opening 88 to the second end opening 92 of the nozzle 76, as illustrated in FIG. 6. While a linear inner wall 78 may be suitable for some applications, a curved inner wall 78 may be preferred since the flow of gas from the nozzle 76 into the processing conduit 26 is more controllable when attempting to achieve an irrotational gas flow. The curvature of inner wall 78 may be determined using finite element method calculations. It has been demonstrated that a curved inner wall 78 of the nozzle 76 produces better particle dispersion, isolation, stratification, electrification, classification, entrainment and acceleration of the material to be conveyed and processed since the gas flow pattern is more controllable in terms of producing a desired (preferably) irrotational or rotational gas flow pattern. The curved contour of the inner wall 78 creates a flow pattern which is more uniform, and allows for more efficient operation since it creates a nonlinear pressure drop through the processing conduit 26. That is, a pressure drop occurs in the initial section of the processing conduit 26 which allows the pressure in the remainder of the processing conduit 26 to be very small. Thus, the driving force for the gas flow is a concentration gradient as opposed to a steady pressure drop. Having low pressure in the majority of the processing conduit 26 is essential to creating as large a boundary layer as possible while having a distinct and separate core region, described further below. Further, the curved contour of the inner wall 78 of the nozzle 76 enables the creation of a larger laminar boundary layer in the gas flow pattern, as described further below.

Figure 7B:
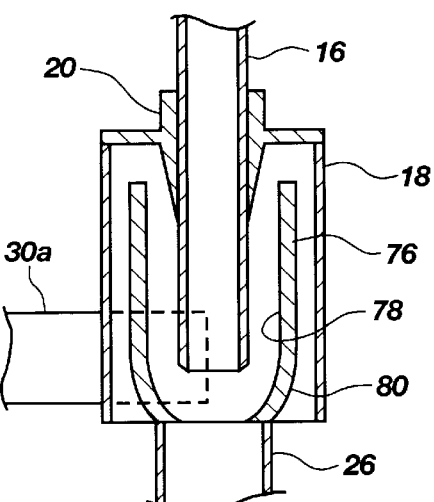
FIG. 7b is a view in cross section of a portion of the plenum housing showing another alternative embodiment of the nozzle.
Figure 7A:
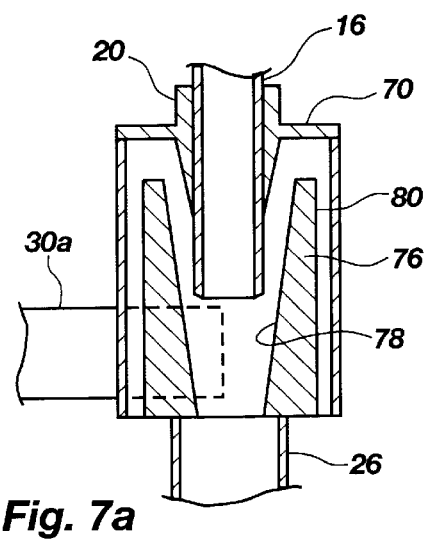
FIG. 7a is a view in cross section of a portion of the plenum housing showing an alternative embodiment of the nozzle.
Figure 7C:
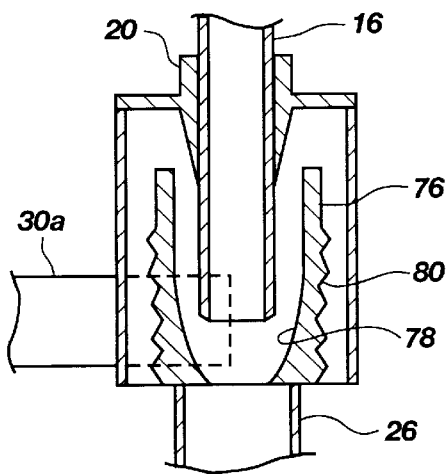
FIG. 7c is a view in cross section of a portion of the plenum housing showing yet another alternative embodiment of the nozzle.

The outer wall 80 of the nozzle 76 may also extend from the first end 88 of the nozzle 76 to the second end 92 of the nozzle 76 in a linear fashion, as shown in FIG. 6, or may extend therebetween in a curvilinear profile, as shown in FIG. 7b, which may further enable the modification of the level of gas homogenization and the effects of thrust on the material being propelled and conveyed. Alternatively, the outer wall 80 of the nozzle 76 may be non-linear and non-even, such as having, for example, a corrugated or uneven surface as shown in FIG. 7c. The uneven outer wall 80 further enhances the mixing of gas in the plenum housing 18 to effectively reduce or eliminate pressurize and velocity gradients.

The diameter of the terminal end 72 of the feed conduit 16 is equal to or greater than the diameter of the second end opening 92 of the nozzle 76 and, therefore, the terminal end 72 of the feed conduit 16 is positioned away from the second end opening 92 of the nozzle 76. An annulus 96, otherwise referred to herein as a vena-contracta, is formed between the terminal end 72 of the feed conduit 16 and the inner wall 78 of the nozzle 76. As previously described, the feed conduit 16 may be axially adjustable relative to the plenum housing 18 and, thus, relative to the inner wall 78 of the nozzle 76 such that the area of the vena-contracta 96, measured between the terminal end 72 of the feed conduit 16 and the inner wall 78 of the nozzle 76, can be selectively adjusted to achieve a desired velocity of the gas and a desired gas flow pattern.

Further, the ability to selectively adjust the terminal end 72 of the feed conduit 16 relative to the nozzle 76 enables the present invention to effectively prevent blowback in the system. That is, a first pressure transducer 98 located toward the rear wall 70 of the plenum housing 18 and a second pressure transducer 100 positioned in proximity to the processing conduit adapter 28 measure the pressure within the plenum housing 18 and processing conduit 26. The onset of blowback is evident when the second pressure transducer 100 measures a preselected critical pressure. This information is sent to the controller 50 which compensates by adjusting the axial positioning of the feed conduit 16 relative to the plenum housing 18 so that the terminal end 72 of the feed conduit 16 is brought into closer proximity to the second end opening 92 of the nozzle 76 (i.e., reducing the area of the vena-contracta 96). When the second pressure transducer 100 detects a lower pressure in the processing conduit 26 relative to the pressure detected in the plenum housing by the first pressure transducer 98, the controller 50 responds by causing the axial movement of the feed conduit to position the terminal end 72 of the feed conduit 16 away from the second end opening 92 of the nozzle 76. Blowback can, therefore, be controlled on a real time basis without having to shut down the operation of the apparatus to adjust either the feed conduit or nozzle, as is required by many prior pneumatic conveyance devices.

In operation of the present invention, gas is supplied by a positive displacement blower, or by other means previously noted, to the source-gas manifold 12 through a supply hose or pipe connected to the source-gas manifold inlet 34. The gas is diffused by the diffuser 44 to insure uniform gas distribution to the manifold outlets 38, 38a, and, thus, to the gas inlets 30, 30a. As the gas passes through the manifold outlets 38, 38a, through the valves 56, 56a and into the gas inlets 30, 30a, the pressure of the gas is continuously monitored by the primary flow transducers 58, 58a and then by the secondary flow transducers 60, 60a, as previously described, to assure that an equal flow of gas is directed into each gas inlet 30, 30a. By providing equal amounts of gas flow through each gas inlet 30, 30a, the opposing gas flows result in a net cancellation of rotational influences, which further promotes the homogenization of the gas flow in the annular space 82 of the plenum housing 18 before being directed into the space 90 between the feed conduit 16 and the outer wall 80 of the nozzle 76. A greater or lesser volume of gas exiting one or the other gas inlets 30, 30a results in a rotational gas flow pattern as the gas exits the second end opening 92 of the nozzle 76 into the processing conduit 26. However, opposing, tangentially-oriented gas streams of equal mass flow will collide and mix sufficiently within the annular space 82 to establish a uniformly homogenized gas flow, which results in the formation of an irrotational flow of gas manifested in the processing conduit 26 as the gas flow exits the nozzle 76.

Gas flows from the annular space 82 to the end space 86 and is then redirected into the space 90 formed between the feed conduit 16 and the inner wall 78 of the nozzle 76. As the gas flows through the space 90 formed about the nozzle 76, it is accelerated until it reaches the vena-contracta 96. For the optimal operation of the invention, it is essential that the flow through the vena-contracta 96 be uniform, i.e. the existence of pressure and velocity gradients, in the θ direction (using cylindrical coordinates), must be minimized. It should be noted that the cross sectional area of the vena-contracta 96 affects the velocity of the gas moving therethrough and can be selectively controlled by axial movement of the feed conduit 16 relative to the nozzle 76. A smaller cross sectional area produced by decreasing the distance between the terminal end 72 of the feed conduit 16 and the inner wall 78 of the nozzle 76 results in more power being required to maintain the same mass flow of gas, but produces a higher velocity gas flow and higher vacuum. Therefore, more material can be conveyed through the processing conduit 26, and for a greater distance therein, provided additional gas is prevented from entering the system. However, if additional gas flow is allowed into the system via the feed inlet 22 of the material feed conduit 16, the resultant increase in gas flow volume will increase the velocity of the flow through the processing conduit 26.

In consideration of the above, the higher the velocity of the accelerated gas exiting the nozzle 76 (provided the mass flow of the gas remains the same), the higher the resultant vacuum created at the feed inlet 22. It follows then that the higher the vacuum created at the feed inlet 22, the greater the amount of material that can be entrained and conveyed, or the farther the same amount of material can be conveyed through the conduit 26. Hence, the strength and maintenance of the induced vacuum at the feed inlet 22 can provide a simple method for determining the amount and the distance a given multi-phase material can be conveyed without creating blowback, regardless of the velocity of the multi-phase flow.

As gas accelerates through the nozzle 76 as previously described, material enters into the feed conduit 16 through the inlet 22. As used herein, "material or materials" refers to any solid, liquid or solid/liquid combination of matter that may be transported for processing through the pneumatic accelerator of the present invention. Material may be metered and fed into the inlet 22 via conventional feeding devices, such as conveyor belts, vibratory feeders, bucket elevators and the like, as long as such devices provide a means of variable control to regulate material-to-gas ratios within the system. When the pneumatic accelerator 10 is vertically-oriented, as shown in FIG. 1, for example, the material may initially move through the inlet 22 and the feed conduit 16 by gravitational force, but may also be subjected to a drag force by a gas flow through the feed conduit 16 induced by a vacuum at the inlet 22 caused by the movement of gas through the vena-contracta 96, as previously noted. When the pneumatic accelerator is horizontally-oriented, or oriented in any angled position, the material is also subjected to the vacuum existing at the inlet 22 resulting from the gas moving through the plenum housing 18 and through the nozzle 76, but the level of vacuum in the feed conduit 16 may be selectively modified or increased by increasing the amount and velocity of gas moving through the vena-contracta 96 and/or by changing the cross sectional area of the vena-contracta 96 as earlier described.

As the materials moving through the feed conduit 16 reach the terminal end 72 thereof, they encounter the velocitized gas flow moving through the vena-contracta 96 and become entrained in the gas flow in an acceleration/mixing zone 102 formed at the second end opening 92 of the nozzle 76 where the nozzle 76 meets the processing conduit 26. In the mixing zone 102, the material is not only entrained with the gas flow, but is accelerated to high velocities, i.e. in excess of 100 mph, as it enters into the conduit 26. The organized gas flow pattern, as described further hereinafter, acts upon the material to control the manner in which the material flows (i.e. irrotationally or rotationally) into the conduit 26.

The present invention is structured to selectively control the flow of the high volume, low pressure gas into the plenum housing 18 to insure the proper flow pattern of the gas as it exits the nozzle 76. The nature of the flow pattern has a direct effect on the ability to disperse and entrain the material to be conveyed and subsequently processed. A gas flow pattern having a three-region character is particularly desirable in processing materials through the pneumatic materials conveyance apparatus of the present invention and renders the present invention unique in being able to achieve and control the desired gas flow pattern, thereby enabling selected particle dispersion, isolation, stratification, electrification and classification, and enabling further processing, such as drying, sorting and pulverization.

The three-region gas flow pattern is more specifically comprised of an inner turbulent core in which the majority of the materials being conveyed is located, an outer, relatively thick, laminar boundary layer which moves along the processing conduit 26 wall, and an intermediate transition region between the inner turbulent core and the outer laminar boundary layer. The achievement of a three region flow with a thick laminar boundary layer is facilitated in the first instance by the ability to control the gas flow through the plenum housing 18 and nozzle 76 as previously described. The desired flow pattern is also facilitated by the configuration of the inner wall 78 of the nozzle 76. Modification of the inner wall 78 to a curvilinear profile permits the controlled delivery of material into the processing conduit 26 with more uniform, consistent velocity and pressure gradients within the vena-contracta 96, which insures all material passing through the mixing zone 102 encounter the effects of rapid acceleration and dispersion. The curvilinear profile of the inner wall 78, in concert with the inner wall 106 of the conduit adapter 28 and the conduit 26, enables the promotion of a strong cushion or boundary layer of gas that keeps material more centrally positioned within the mixing zone 102 and the conduit 26, and away from the surfaces of those structures, thereby decreasing overall contact and subsequent wear.

Figure 9:
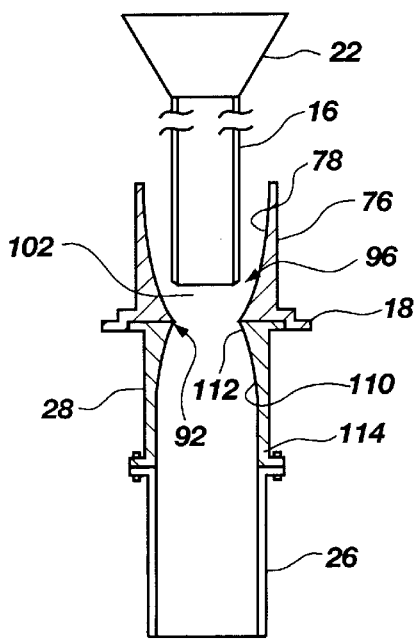
FIG. 9 is a view in cross section of the invention showing an embodiment of the pneumatic accelerator with a convergent/divergent nozzle and with the conduit adapter bolted to the processing conduit.
Figure 8:
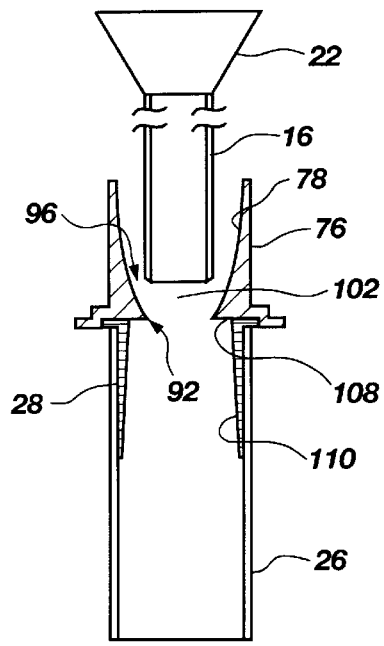
FIG. 8 is a view in cross section of the pneumatic accelerator of the present invention illustrating a first means of connecting the processing conduit with the conduit adapter.

The relationship of the nozzle 76 to the processing conduit 26, and its importance in determining the pattern of flow of material through the processing conduit 26 is further illustrated in FIGS. 6, 8 and 9. In a first embodiment shown in FIG. 6, the processing conduit 26 may be secured to the plenum housing 18 via the conduit adapter 28 into which the processing conduit 26 is positioned. Where, as shown in FIG. 6, the diameter of the processing conduit 26 is greater than the diameter of the second end opening 92 of the nozzle 76, an area of expansion 108 occurs between the second end opening 92 of the nozzle 76 and the linear inner wall 106 of the processing conduit 26. The relationship of the nozzle 76 to the processing conduit 26 in this embodiment may be referred to as a "convergent-type nozzle." The abrupt transition between the convergent second end opening 92 of the nozzle 76 and the processing conduit 26 is a configuration which is particularly suitable for use when operating with gas velocities below the speed of sound. Similarly, an alternative embodiment of the invention shown in FIG. 8, where the processing conduit 26 is positioned on the outside of the conduit adapter 28 and the inner wall 110 of the conduit adapter 28 provides an area of expansion 108 beyond the second end opening 92 of the nozzle 76.

FIG. 9 illustrates an alternative arrangement of the nozzle 76 and processing conduit 26 which may be characterized as a convergent/divergent type because the diameter of second end opening 92 of the nozzle 76 is substantially equal to the diameter of the first end 112 of the conduit adapter 28, which, in this embodiment, is directly secured to the plenum housing 18. The processing conduit 26 is secured to a second end 114 of the conduit adapter 28. The inner wall 110 of the conduit adapter 28 is curved in a direction from the first end 112 to the second end 114 of the conduit adapter 28 and, thereby, produces a divergent profile in the conduit adapter 28. As gas and entrained material move from the acceleration/mixing zone 102 into the conduit adapter 28, the transition is from a convergent profile (of the nozzle 76) to a divergent profile (of the conduit adapter 28). This convergent/divergent type of nozzle 76 and conduit adapter 28 arrangement is most suitable for use when operating at gas velocities at or above the speed of sound (i.e., supersonic).

The purpose of either arrangement, convergent or convergent/divergent, is to create a gas flow pattern which aerodynamically promotes the formation of a larger laminar boundary layer within the length of the processing conduit 26. The pneumatic accelerator 10 operates to maximize the distinction between the turbulent core and the laminar boundary layer of the patterned gas flow. This may be accomplished by using a convergent-type nozzle when operating with air velocities below the speed of sound at the vena-contracts or a convergent/divergent type nozzle when operating above the speed of sound. Although the fluid (i.e., gas) within the core is turbulent, the material is seen to travel in an ordered and linear trajectory when the present invention is configured to provide irrotational gas flow conditions. The turbulence within the core of the fluid stream is critical in maintaining particle isolation because it causes each particle to rotate about its center of mass and, as such, enables each particle to establish a realm of isolation from other particles. The turbulent fluid core is also critical in maximizing the drying ability of the accelerator. The turbulence increases the ability of the gas to hold moisture and, therefore, dry the particles. This is due to the kinetic energy of the gas as opposed to thermal energy in conventional drying systems. Which nozzle arrangement is selected for use is dictated by the material being processed (i.e., certain materials require greater acceleration rates to enable a desired processing parameter, such as pulverization or sorting).

The structure of the present invention is further unique in being able to control the flow pattern of the gas to achieve further processing of the material beyond simply conveying the material through the system. For example, the pneumatic materials conveyance apparatus can pulverize, dry, sort and classify materials as a function of the aerodynamic diameter of the particles being conveyed. The average aerodynamic diameter of the particles (i.e., the diameter of a particle of unit density (1 g/cc) having the same terminal settling velocity) comprising a given bulk material is unique to that material. Therefore, the pneumatic accelerator apparatus 10 must necessarily be adjusted for each material processed, dependent upon the desired results of such processing (e.g., pulverizing, sorting, etc.), by coordinating the area of the vena-contracta 96 with the gas flow, which is affected by the position of the valves 56, 56a. The coordinated adjustments determine the vacuum imposed at the feed inlet 22, the velocity and mass flow of the gas exiting the nozzle 76, and the desired irrotational or rotational flow of both materials and gases introduced into the system. Thus, the present invention can be finely adjusted to selectively process (e.g., sort or stratify) particulate matter based on the aerodynamic diameter of the particles.

Figure 10:
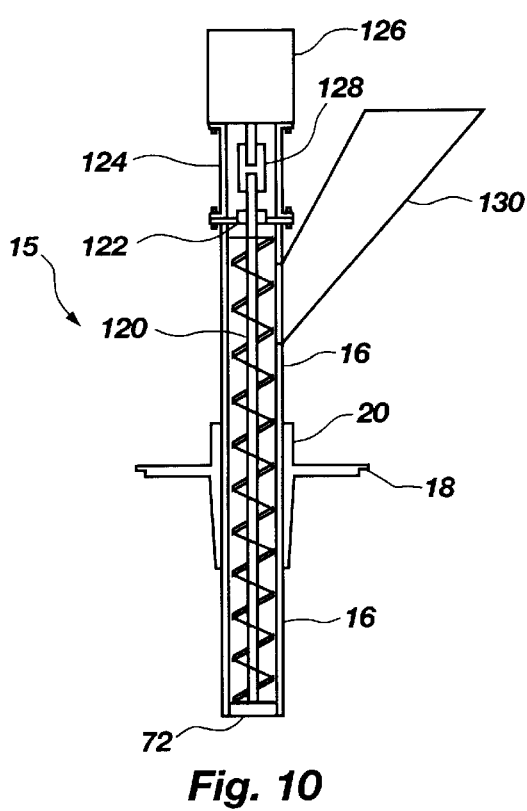
FIG. 10 is a view in cross section of an alternative embodiment of the feed mechanism where the feed mechanism includes a screw conveyor or auger.

The principal structural elements and operation of the present invention having been described, it is notable that the configuration of the pneumatic materials conveyor can be further modified to achieve different types of processing of materials, or can be modified to handle different types of material. For example, FIG. 10 illustrates that the feed mechanism 15 of the invention can be modified to employ a screw conveyor 120, or auger, within the feed conduit 16 for certain applications, such as processing wet materials. In this embodiment, the feed conduit 16 may be structured with a bearing adapter plate 122 which, in turn, is connected to a motor adapter 124. A motor 126 is connected to the motor adapter 124 and is also connected to a shaft connecting adapter 128 which provides motive force for turning the screw conveyor 120. In this alternative embodiment of the invention, the feed conduit 16 may also be structured to be axially adjustable in relation to the plenum housing 18 and nozzle as previously described. FIG. 10 also illustrates that the feed mechanism 15 may further comprise a feed hopper 130 for introducing materials into the feed conduit 16 and/or into the screw conveyor 120.

Figure 11:
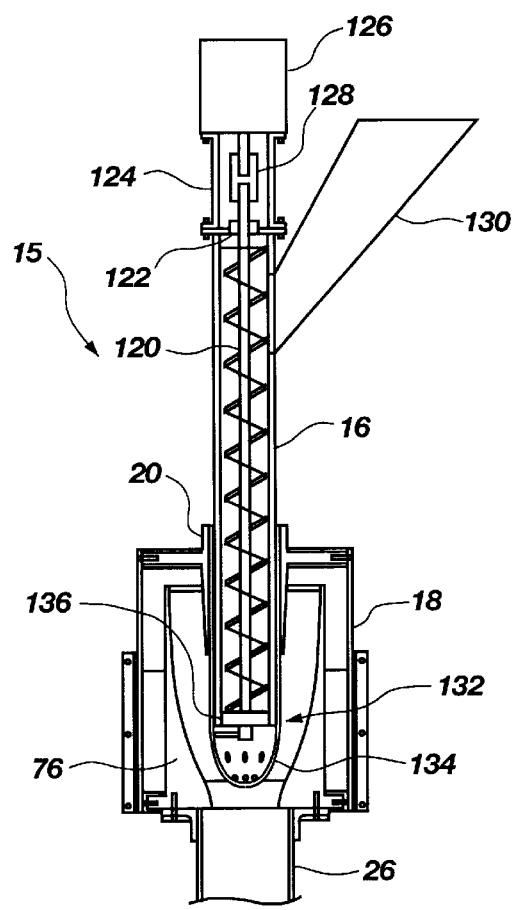
FIG. 11 is a view in cross section of an alternative embodiment of the feed mechanism configured with an extruder.

In another alternative embodiment of the invention, shown in FIG. 11, the feed mechanism 15 may be structured as an extruder 132 to enable the processing, for example, of slurries, pastes or liquid suspensions. The feed mechanism 15, which may include a screw conveyor 120 as shown, can be modified to an extruder by attaching a suitable apertured end cap 134 to the end 136 of the augered feed conduit 16. The apertured end cap 134 may, most suitably, be curved in a manner to match the contour of the inner wall 78 of the nozzle 76 to maintain the aerodynamic character of the gas flow through the vena-contracta 96.

Figure 12:
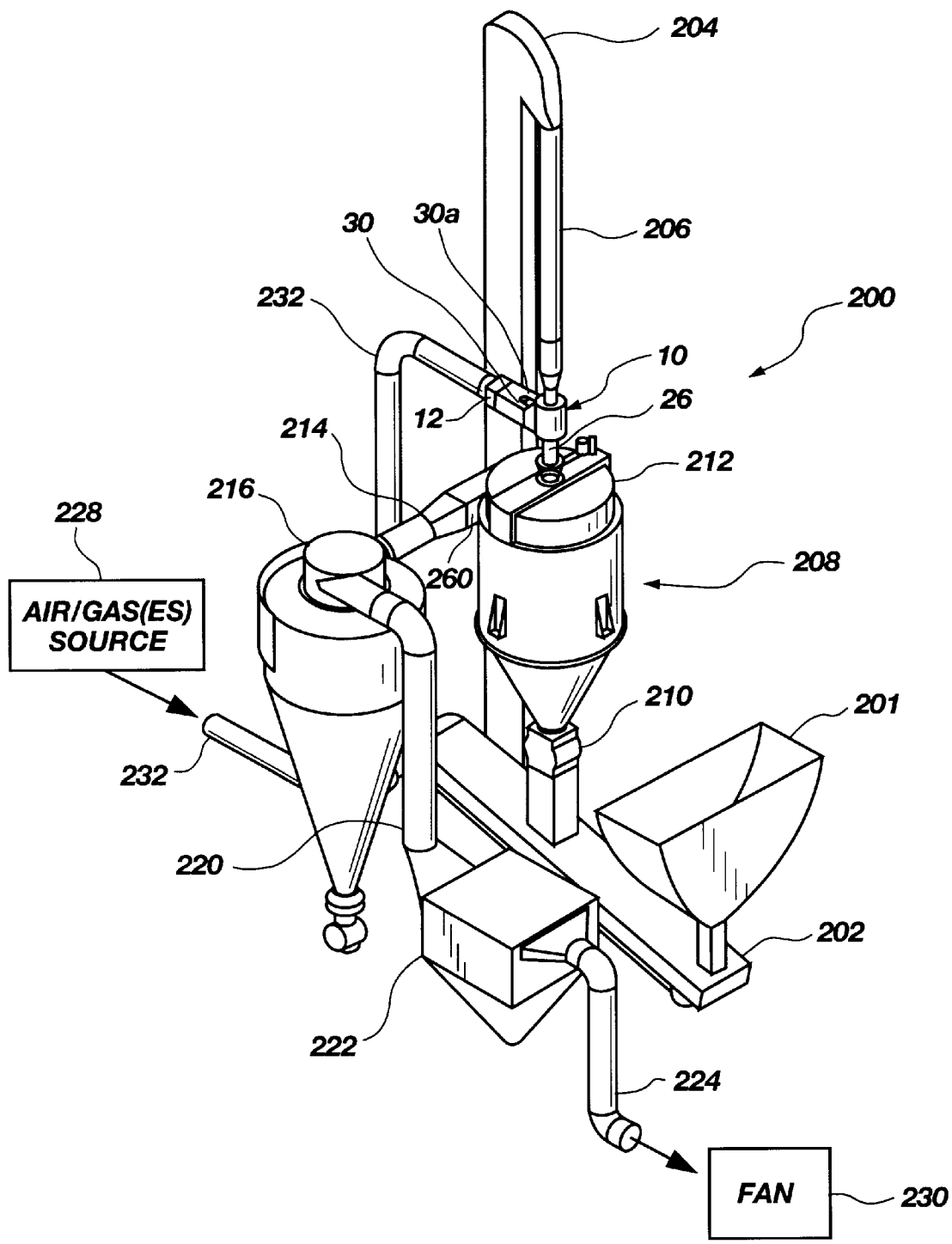
FIG. 12 is a schematic representation of an embodiment of the pneumatic accelerator configured for use in a pulverization/drying/classification system, having an internal classifier assembly.

The pneumatic materials conveyance apparatus of the present invention can be combined with a number of additional structures to achieve additional processing of the materials being conveyed. For example, FIG. 12 illustrates the pneumatic accelerator 10 when it is used in a pulverization/drying/classification system 200. In this embodiment, the pneumatic accelerator 10 is configured as shown in FIG. 1 with a smaller and more compact source-gas manifold 12 and with dual inlets 30,30a. The system is substantially comprised of a feed hopper 201, a belt conveyor 202, a bucket elevator 204, a feed chute 206, a pneumatic accelerator 10, a pulverization chamber 208, an air lock 210, a first fines or undersize exhaust chamber 212, a second fines or undersize exhaust duct 214, a cyclone separator 216, a dust duct 220, a baghouse 222, a clean air duct 224, a gas source 228, a baghouse fan 230 and the source-gas conduit 232.

Figure 13:
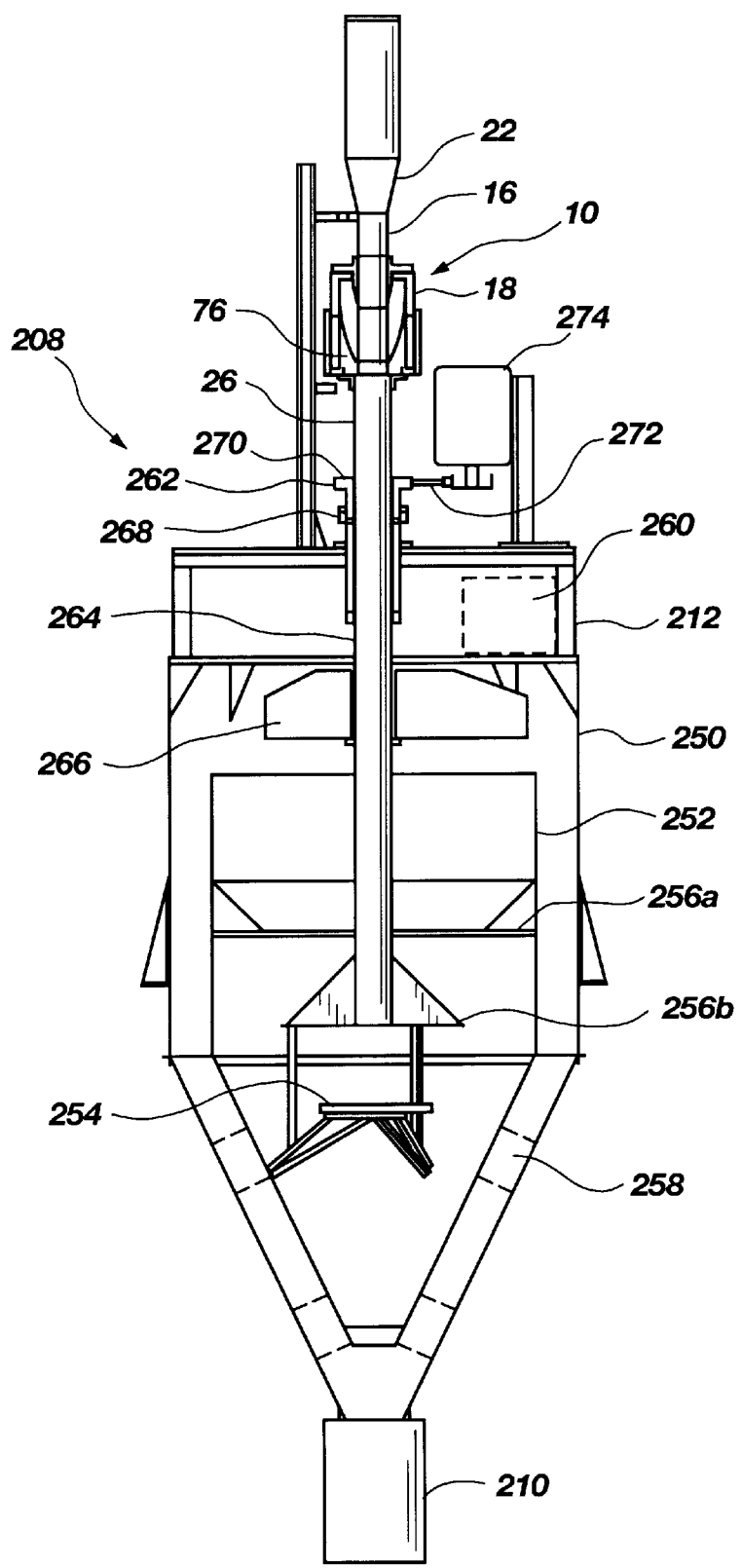
FIG. 13 is an enlarged view, in partial cross section, of the internal components of a pulverization/drying/classification chamber shown in FIG. 12.
Figure 14:
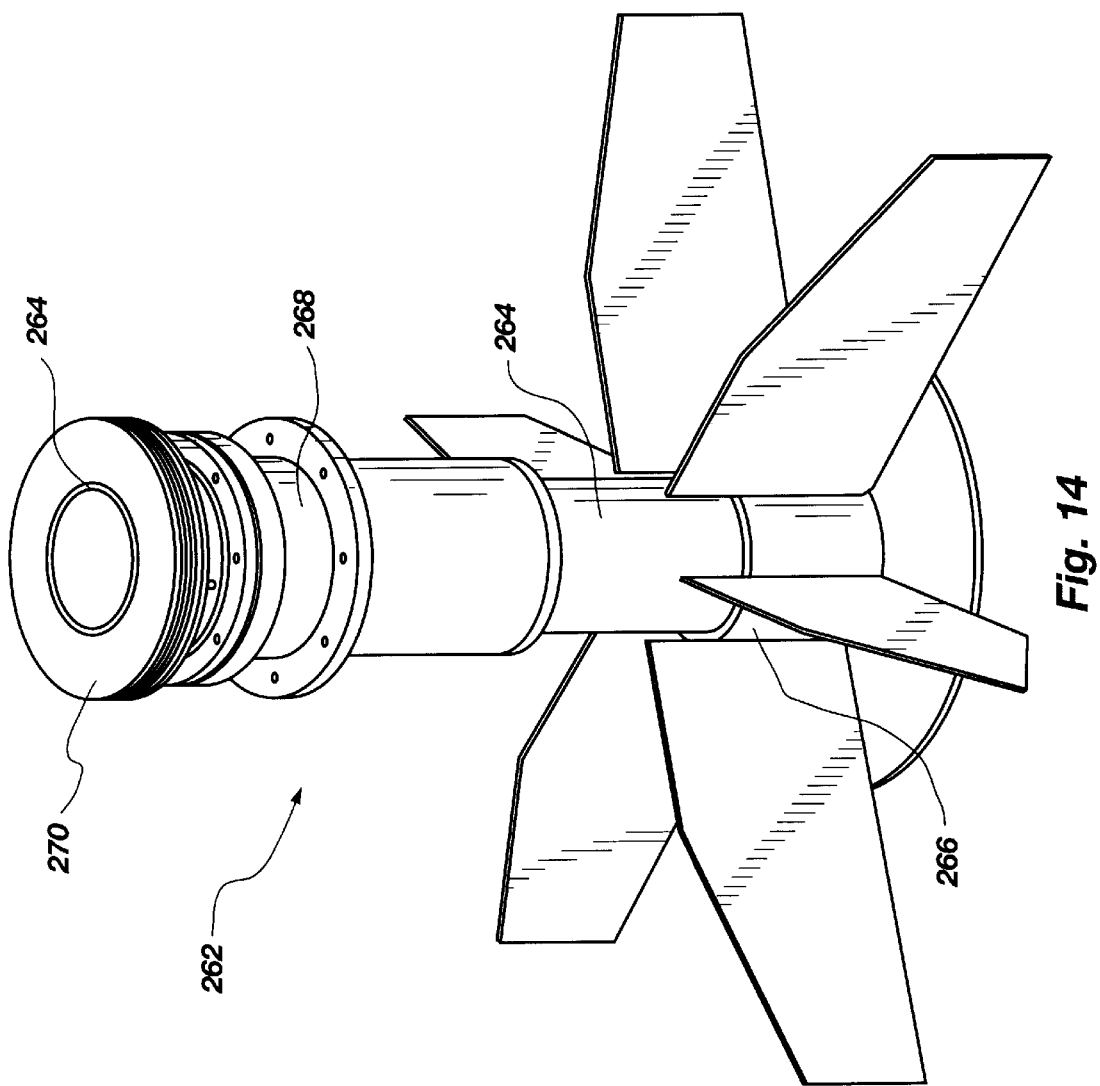
FIG. 14 is an enlarged view of the classifier assembly shown in FIG. 13.

FIG. 13 is a cross sectional view of the pulverization chamber 208 showing its internal configuration. The pulverization chamber 208 is substantially comprised of an outer chamber 250, an inner chamber 252, an ablative plate assembly 254, deflection plates 256a, 256b, a group of spacers 258, which support the inner chamber 252, a conduit 26, an exhaust chamber 212, an exhaust duct 260 and an air-lock mechanism 210. Also shown in FIG. 13 is a classifier assembly 262 comprised of a hollow shaft 264, a blade assembly 266, a shaft bearing housing 268, a sheave 270, a poly-v belt 272, and an electric motor 274, which is connected to a variable frequency drive (not shown). FIG. 14 provides an enlarged view of the classifier assembly 262.

Figure 15:
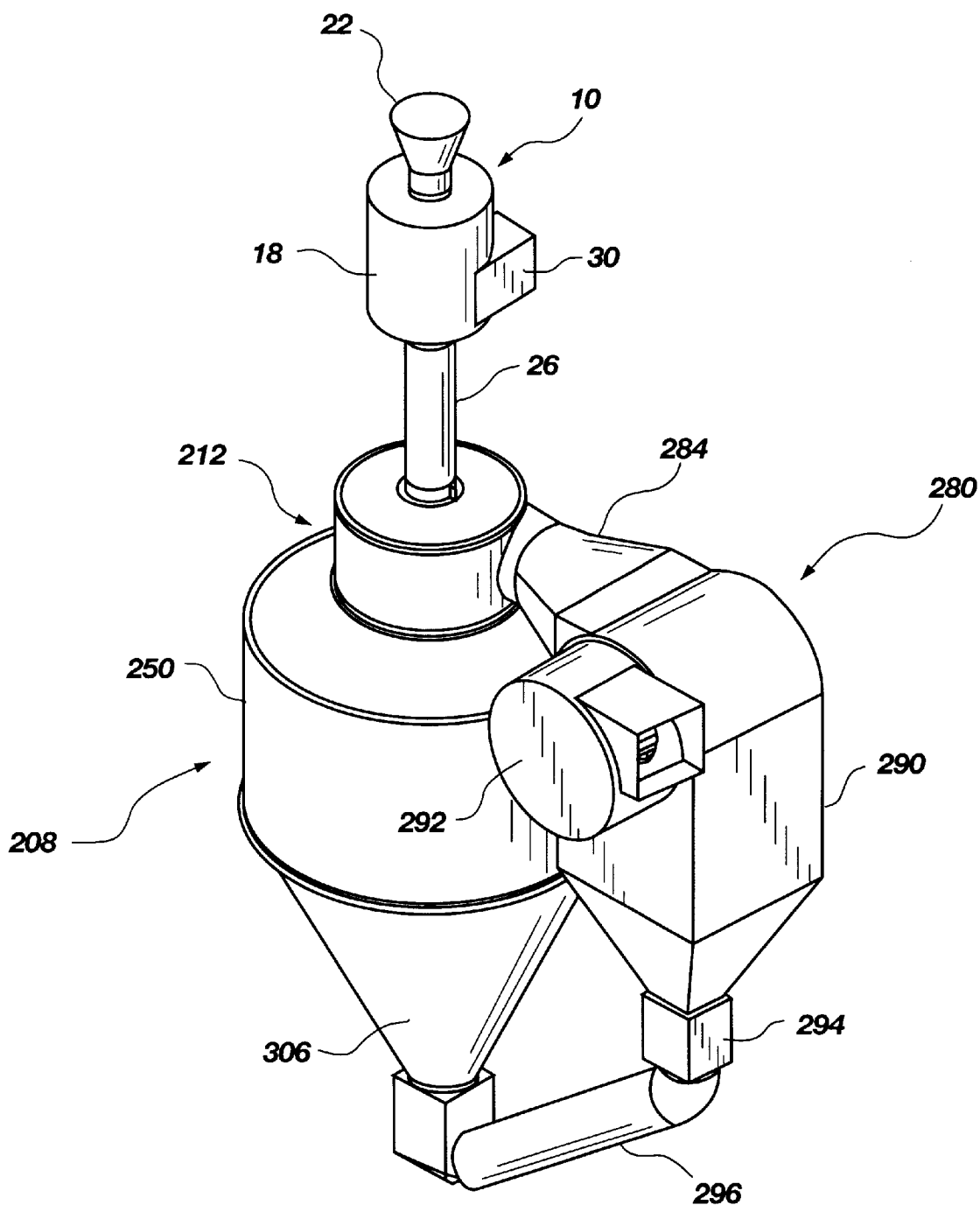
FIG. 15 is a perspective view of an alternative embodiment of the pulverization/drying/classification system having an external classifier assembly.
Figure 16:
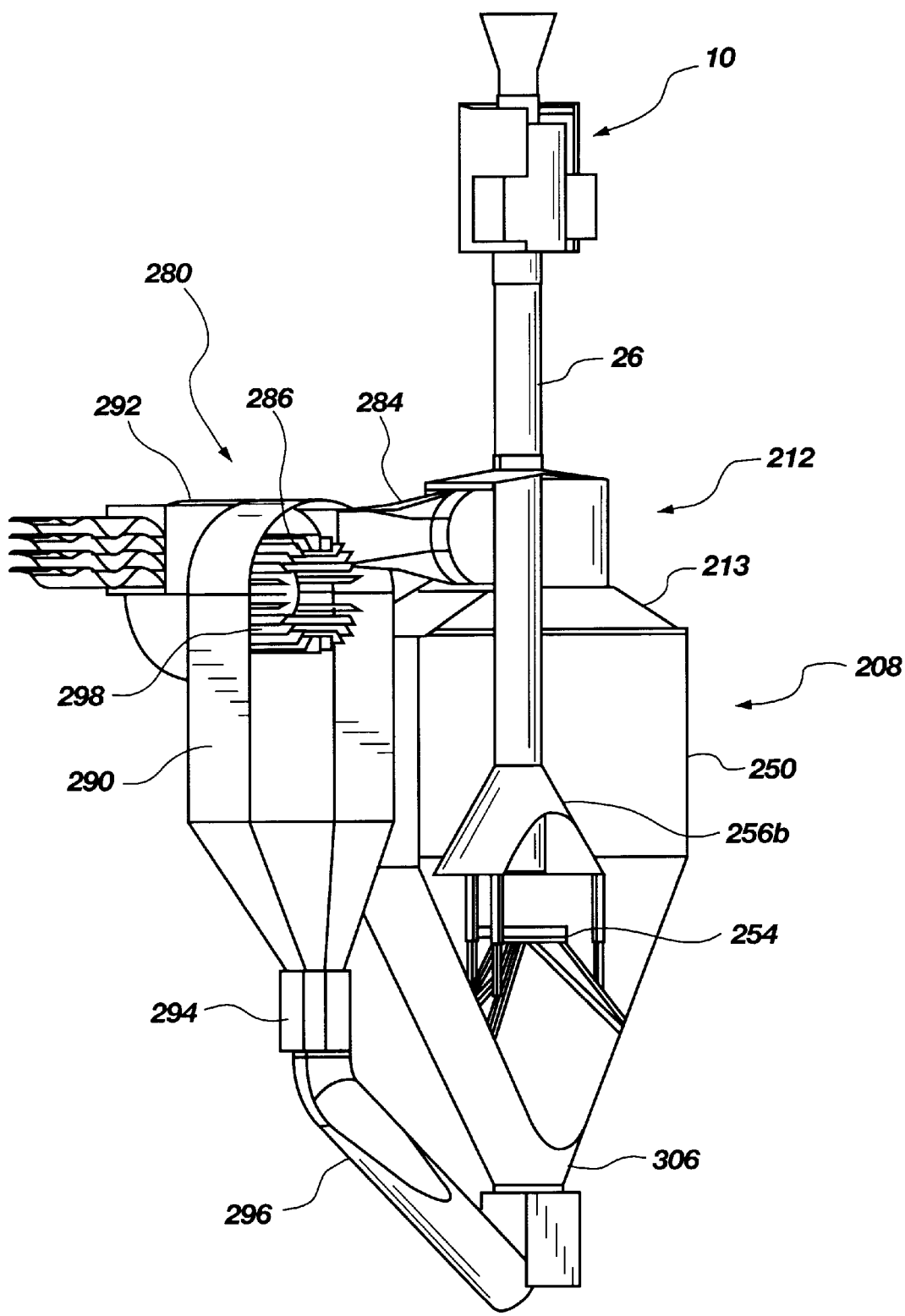
FIG. 16 is a view in elevation of the assemblage shown in FIG. 15, turn 180°, and shown in partial cutaway to illustrate the blade assembly of the embodiment.
Figure 17:
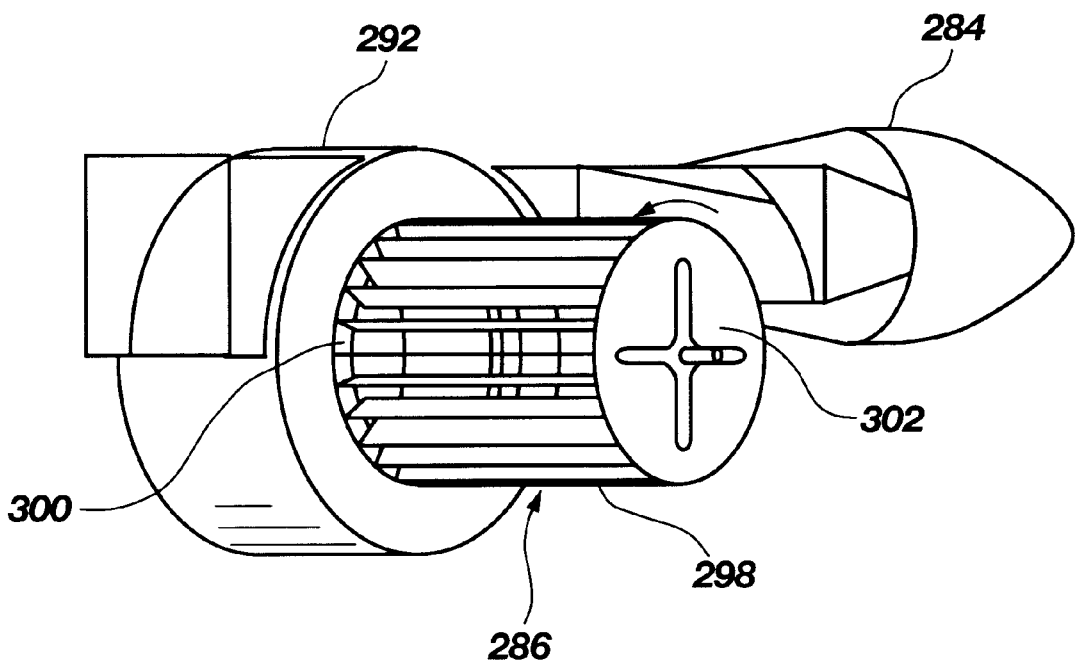
FIG. 17 is an enlarged view of the blade assembly shown in FIG. 16 with components removed for ease of understanding.
Figure 17:
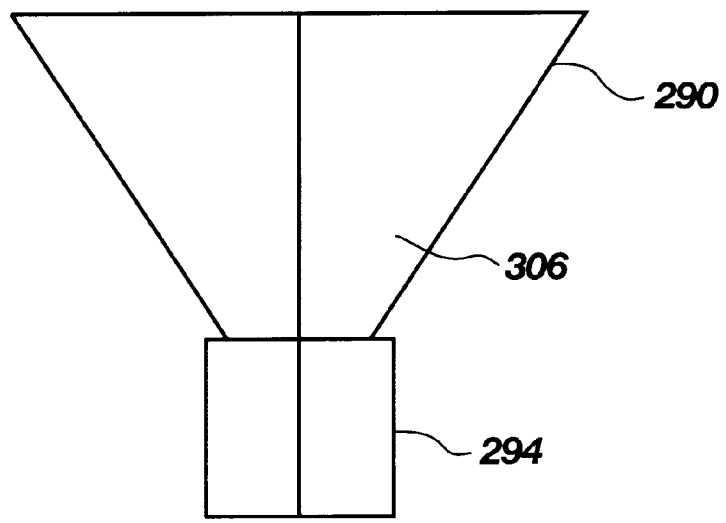

FIGS. 15, 16 and 17 show varying views of an alternative embodiment of the pneumatic accelerator 10 when used in a pulverization/drying/classification system having a classifier assembly 280 external to the pulverization chamber 208. The classifier assembly 280 of this embodiment is comprised of an inlet 284, a horizontally aligned blade assembly 286 (FIG. 16), a motor (not shown) to power the classifier blade assembly 280, a chamber 290, an exhaust housing 292, an air-lock mechanism 294 and an oversize return chute 296. The pulverization chamber 208 has a different type of exhaust chamber 212 which includes a tapered top 213 (FIG. 16). The blade assembly 286 in this embodiment is horizontally-oriented and is of the squirrel-cage type where dust laden gas travels through the rotating blades 298 in a radial pattern and exits axially through a hollow plate 300 (FIG. 17) positioned opposite a hub plate 302 and motor (not shown) into the bottom 306 of the exhaust housing 290.

In operation of the illustrated invention to reduce or pulverize and dry material, feed material is placed in the feed hopper 201 (FIG. 12) from where it is conveyed to the bucket elevator 204. The bucket elevator 204 feeds the pneumatic accelerator 10 at a rate that is controlled by the belt conveyor 202. The material is accelerated vertically downward through the (non-rotating) conduit 26, which passes through the rotating hollow classifier assembly shaft 264. The conduit 26 is rigidly attached to the deflection plate 256 and to the pneumatic accelerator 10 and passes through the hollow rotating shaft 264. The accelerated material is directed toward and strikes the ablative plate assembly 254. This is where the size reduction occurs. As the material hits the ablative plate assembly 254, the material rebounds upwardly in a radially outward fashion from the ablative plate assembly 254 and is deflected against the deflection plate 256b, after which it is redirected downward. The oversize material is deflected by the deflection plates 256a toward the bottom of the chamber 252 and the air-lock 210. Oversize material is then returned to the conveyor belt 202 where it is conveyed back to the pneumatic accelerator 10 to be further reduced in size by subsequent passes. Undersize material is carried in a gas stream through the rotating blade assembly 266, into the exhaust chamber 212, out the exhaust duct 260 and into the cyclone separator 216 where 90% or more of the material is separated from the gas stream. The internal classifier 262 (FIG. 13) directs oversize material between the outer chamber 250 and inner chamber 252 where it is returned to the belt conveyor 202 via the air-lock 210. The external classifier 280 (FIG. 15) operates to direct the oversize material to the bottom 306 of the chamber 290, into the air-lock mechanism 294, and down the oversize return chute 296 where it is added to the oversize material from the pulverization chamber 208.

The internal classifier assembly 262 and external classifier assembly 280 both operate to introduce an additional force component on the particles as they are conveyed out of the pulverization chamber 208 by the gas flow. This force is centrifugal in nature and acts as a barrier to particles that are oversized. By varying the rpm of the blade assembly 266, which is attached to the hollow shaft 264, the cut size of material leaving the pulverization chamber 208 can be changed. The same sizing variation is similarly accomplished by the external classifier 280 by modulating the rpm of the horizontally-oriented blade assembly 286.

Figure 18:
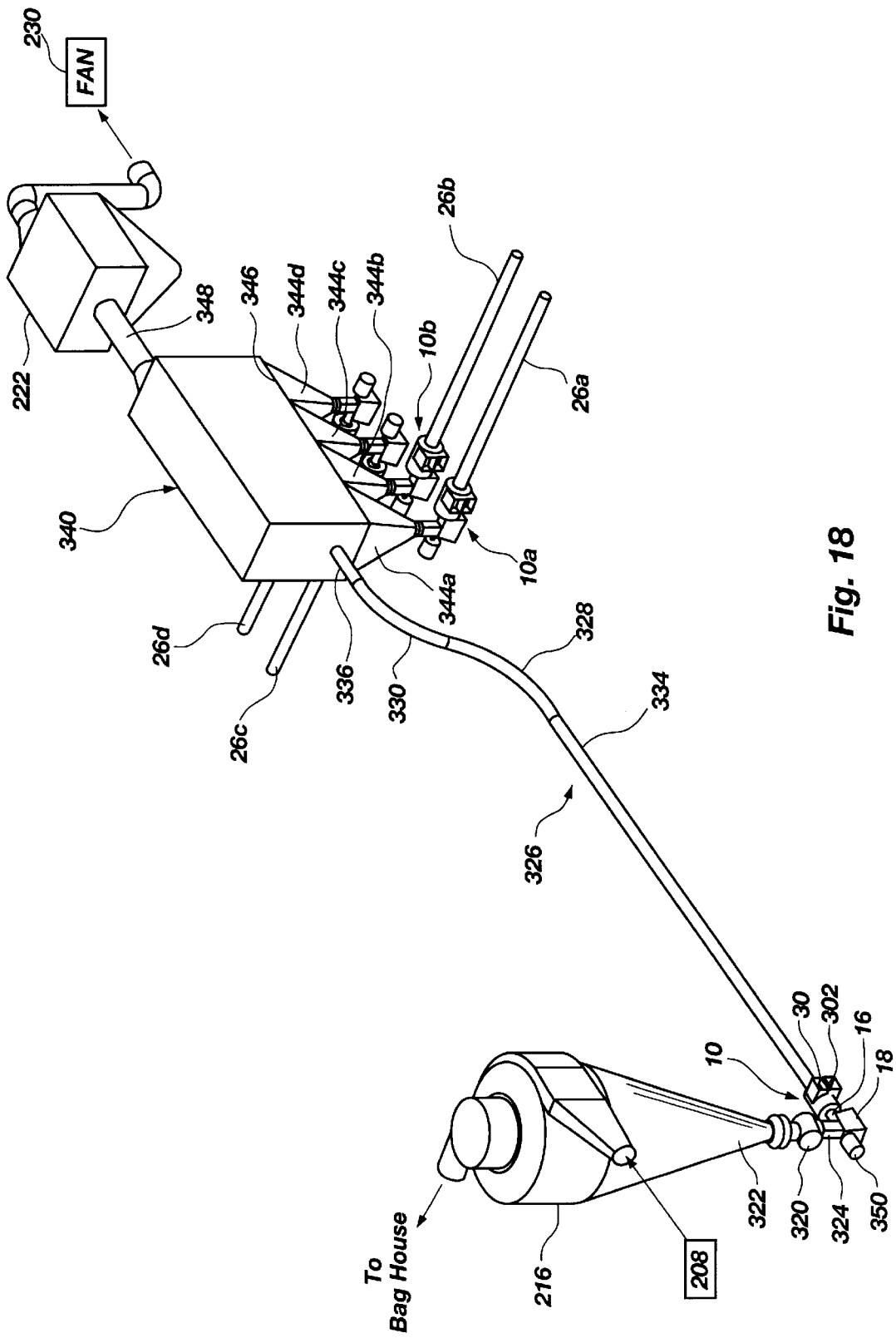
FIG. 18 is a perspective view of a classifying assembly employing the pneumatic accelerator of the present invention.

FIG. 18 shows one embodiment of the invention used to classify materials according to aerodynamic diameter. A cyclone separator 216 separates and collects the pulverized material (size distribution of the material is a function of the classifier rpm and the amount of gas entering the pulverization chamber 208 (schematically shown in FIG. 18) via the pneumatic accelerator 10) from the gas stream. Although FIG. 18 shows the pneumatic accelerator 10 receiving material from the cyclone 216, it does not necessarily have to be so configured. The pneumatic accelerator 10 may receive material from any suitable silo, hopper, bin, or the like, as long as it provides a steady feed to the pneumatic accelerator 10. An air lock 320 is attached to the bottom 322 of the cyclone separator 216 and to the hopper 324 of the feed conduit 16. A pneumatic accelerator 10 is thus aligned and attached to the feed conduit 16.

Figure 19:
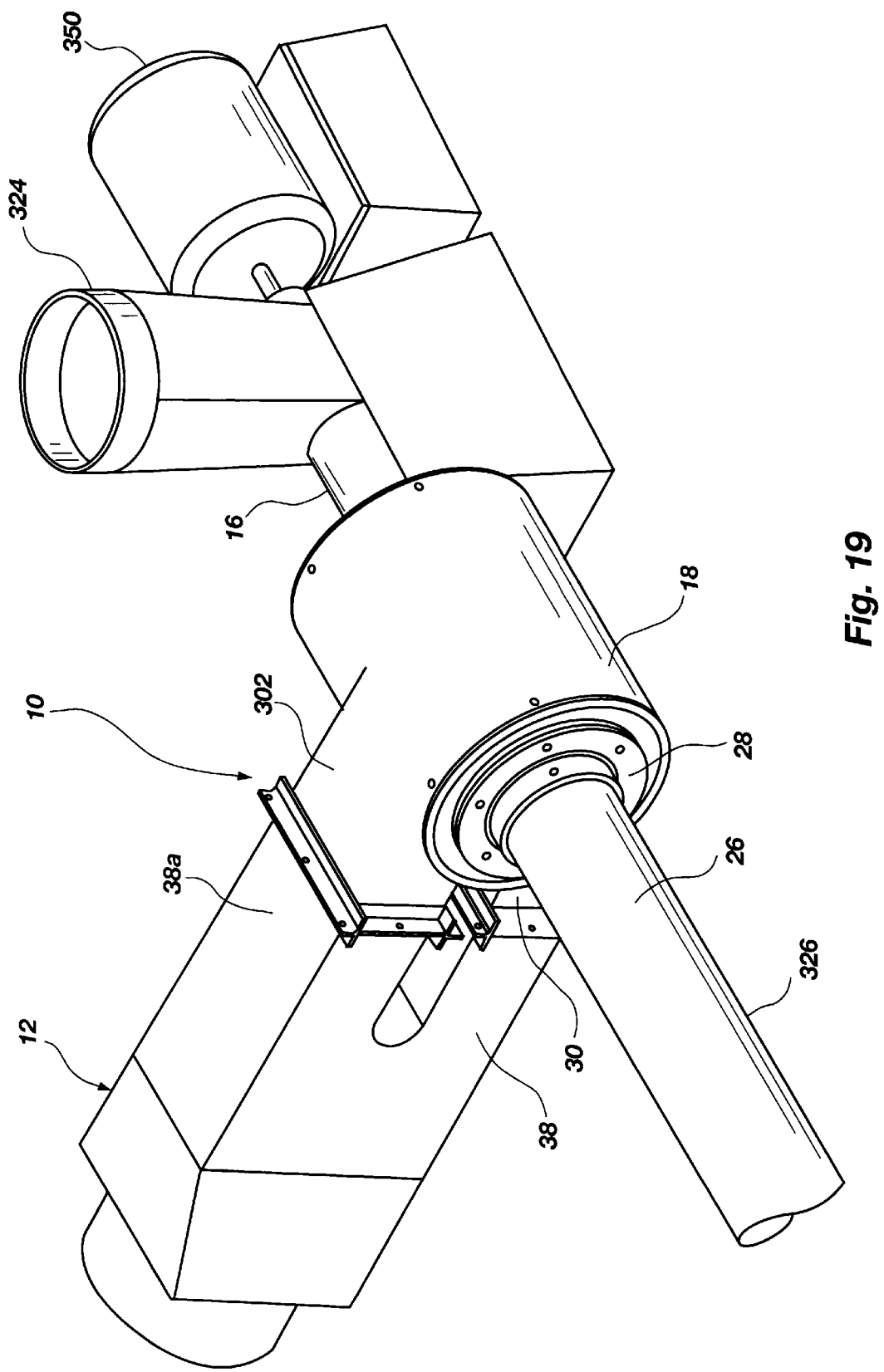
FIG. 19 is an enlarged view of the pneumatic accelerator shown in FIG. 18.

FIG. 19 is an enlarged view of the pneumatic accelerator 10 shown in FIG. 18. This figure illustrates a horizontal alignment of the pneumatic accelerator 10. The feed conduit 16 in this embodiment may be either a hollow tube, as previously described in FIG. 1, or may include an auger, as previously described with respect to FIG. 10. If an auger is used, it would be turned by motor 350. Although not shown in FIG. 19, this embodiment employs the control apparatus, the gas inlet valves, the wiring, stepper motors, flow transducers, pressure transducers and the feed conduit adjuster as previously described with respect to FIG. 1.

Figure 20:
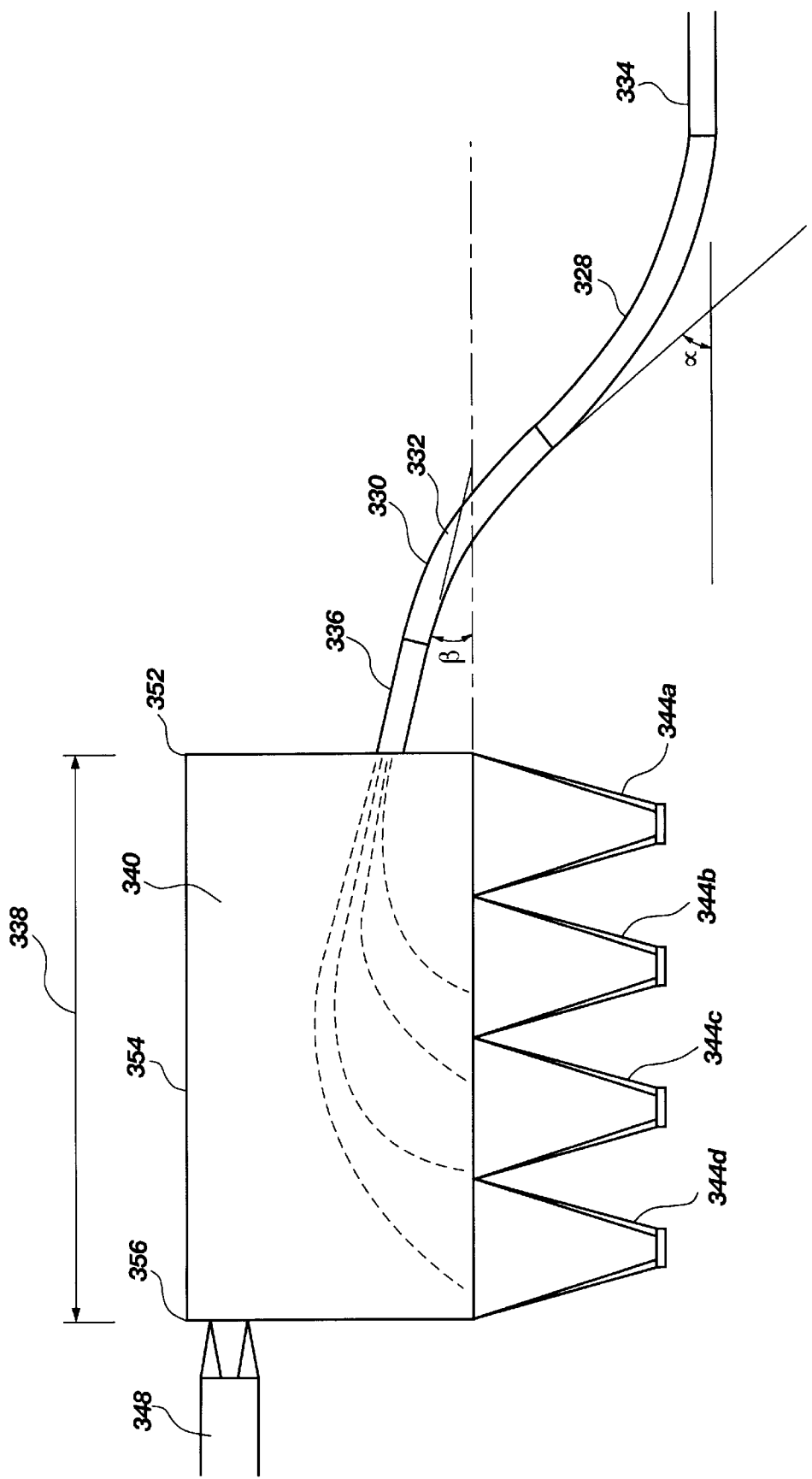
FIG. 20 is a view in cross section of a portion of the classification chamber and curved processing conduit shown in FIG. 18.

A special type of processing conduit 326 is used to convey the material to the classification chamber 340. This processing conduit 326 has an s-type curve, as shown more FIG. 20. The conduit 326 has a constant circular cross section, but may in fact be of any cross-sectional shape as is deemed necessary to derive the required classification result. The classification chamber 340 is shown in FIGS. 18 and 20 to be of a rectangular shape when viewed in lateral cross section, with collection bins 344a, 344b, 344c, 344d attached to the bottom 346 of the chamber 340.

Alternatively, the classification chamber 340 may be circular in lateral cross-section. A cylindrical-shaped classification chamber 340 may be suitably used to minimize turbulence within the classification chamber 340. Although the embodiment shown in FIGS. 18 and 20 have four collection bins 344a–d, the actual number of collection bins will depend on the production rate of the system and the number of cut sizes of material. FIG. 18 shows that connected to the bottom of each of the collection bins 344a–d is a pneumatic accelerator 10 of the present invention comprising the elements previously described and referenced. These pneumatic accelerators 10 may be used to perform subsequent classification, drying, pulverization, conveyance and/or electrification of particles. Connected to the classification chamber 340, via a duct 348, is a baghouse 222 or some other suitable air cleaner or scrubbing device.

In operation of the invention to classify according to aerodynamic diameter of the material, the product collected in the cyclone separator 216 is fed into the feed conduit hopper 324. The material is then accelerated, dispersed, isolated, stratified, electrified and conveyed through the conduit 326. As used herein, "electrified" means that the material has an electrical static charge induced upon it due to the high velocity gas flow that it is entrained within. Another source of static charge or electrification is due to contact with other material with dissimilar work functions. Electrification can be accomplished by these two forms or by other known methods of inducing static charges. As the material passes through the first curve 328 (FIG. 20) and then through the second curve 330 it is accelerated toward the inside wall of the conduit 326, or the outside of the arc 332, where it is inertially positioned by aerodynamic diameter of the particle. The particles that make up the bulk material are typically of a range of sizes, shapes and ultimately aerodynamic diameters. As such these particles will penetrate the boundary layer to greater or lesser degrees depending on this aerodynamic diameter of the particles. In this way the material becomes stratified with particles of the same aerodynamic diameter existing within the same strata. As material exists the conduit 326 into the classification chamber 340, the particles will have a range of velocities depending on the aerodynamic diameter of the particles, the mass flow of the gas and the material, the cross-section of the conduit 326 and the arrangement of the s-type curve and thus will decelerate and fall into the appropriate collection bin 344*a–d*. What is meant by "arrangement of the s-type curve" is the radius of curvature of the first curve 328 and second curve 330, and the angles $\alpha$ and $\beta$, as well as the lengths of the first straight section 334 and second straight section 336 of the conduit 326.

Many factors will determine the deceleration rate and ultimately the performance of the classifier. These factors include the size and shape of the cross-section of the classification chamber 340, the length 338 (FIG. 20) of the classification chamber 340 and the amount of gas being introduced into the chamber 340 via the pneumatic accelerator 10. It is also possible to use cross-currents of gas within the chamber 340 to get a more narrow cut size of material within each collection bin 344*a–d*. Such cross currents can be generated by changing the position of the exhaust duct 348 relative to the classification chamber 340 so that it is drawing gas and dust from either the front end 352 of the chamber 340, the back end 356 of the chamber 340 of the top 354, or any combination thereof. Most materials when accelerated by the pneumatic accelerator 10 will acquire a net positive or negative static charge on its surface. The classification chamber can thus be fitted with electrostatic precipitators to separate materials according to this static charge.

The pneumatic materials conveyance apparatus of the present invention is configured to not only convey materials, but to provide further processing capabilities unknown in conventional dilute phase pneumatic conveyors. The present invention can be configured to convey and process virtually any multi-phase material in a selectively patterned gas flow to achieve selected particle dispersion, isolation, stratification, electrification and classification through controlled irrotational or rotational gas flows, thereby enabling sorting, pulverization, classification, drying and other processing of materials being conveyed. Thus, reference herein to specific details of the illustrated embodiments is by way of example and not by way of limitation. It will be apparent to those skilled in the art that many modifications of the basic illustrated embodiment may be made without departing from the spirit and scope of the invention as recited by the claims.

What is claimed is:

1. A pneumatic materials conveyance apparatus, comprising:

a plenum housing having a plurality of gas inlets;

a feed conduit having a terminal end positioned within said plenum housing;

a nozzle positioned within said plenum housing providing a space between said nozzle and said plenum housing, said nozzle being axially aligned with said feed conduit and being positioned about said terminal end thereof to provide an annular space between said terminal end of said feed conduit and said nozzle; and a processing conduit extending from said plenum housing in axial alignment with said nozzle and feed conduit.

2. The pneumatic materials conveyance apparatus of claim 1 further comprising a source of gas positioned to introduce gas into said plurality of gas inlets.

3. The pneumatic materials conveyance apparatus of claim 2 wherein said source of gas further comprises a manifold being structured to provide gas to each said plurality of gas inlets.

4. The pneumatic materials conveyance apparatus of claim 3 wherein said manifold further comprises a diffuser.

5. The pneumatic materials conveyance apparatus of claim 4 wherein said manifold further comprises a secondary gas inlet.

6. The pneumatic materials conveyance apparatus of claim 4 wherein each of said plurality of gas inlets includes a selectively adjustable valve therein.

7. The pneumatic materials conveyance apparatus of claim 1 wherein said plurality of gas inlets comprises two gas inlets which are tangentially positioned relative to said plenum housing.

8. The pneumatic materials conveyance apparatus of claim 7 wherein each said gas inlet further comprises a selectively adjustable valve regulating the flow of gas therethrough.

9. The pneumatic materials conveyance apparatus of claim 8 further comprising control apparatus in communication with said valves to selectively control the opening thereof.

10. The pneumatic materials conveyance apparatus of claim 1 wherein said nozzle further comprises a first end opening, a second end opening and an inner wall extending therebetween.

11. The pneumatic materials conveyance apparatus of claim 10 wherein said inner wall of said nozzle is linear from said first end opening to said second end opening.

12. The pneumatic materials conveyance apparatus of claim 10 wherein said inner wall of said nozzle curves inwardly from said first end opening toward said second end opening.

13. The pneumatic materials conveyance apparatus of claim 10 wherein the outer wall of said nozzle is non-linear from near said first end opening to near said second end opening.

14. The pneumatic materials conveyance apparatus of claim 10 wherein said processing conduit has a first end, the diameter of which is larger than the diameter of said second end opening of said nozzle.

15. The pneumatic materials conveyance apparatus of claim 10 wherein said processing conduit has a first end, the diameter of which is substantially equal to the diameter of said second end opening of said nozzle.

16. The pneumatic materials conveyance apparatus of claim 1 wherein said feed conduit is slidably adjustable relative to said plenum housing and said nozzle.

17. The pneumatic materials conveyance apparatus of claim 1 wherein each said gas inlet of said plurality of gas inlets further comprises a selectively adjustable valve regulating the flow of gas therethrough.

18. The pneumatic materials conveyance apparatus of claim 1 further comprising rotatable auger positioned within said feed conduit.

19. The pneumatic materials conveyance apparatus of claim 1 wherein said feed conduit is configured with an extruder device.

20. The pneumatic materials conveyance apparatus of claim 1 further comprising a pulverization apparatus and a particle classifier assembly.

21. The pneumatic materials conveyance apparatus of claim 20 wherein said particle classifier assembly is positioned within said pulverization apparatus.

22. The pneumatic materials conveyance apparatus of claim 20 wherein said particle classifier assembly is positioned external to said pulverization apparatus.

23. The pneumatic materials conveyance apparatus of claim 1 further comprising a classifier assembly attached to said processing conduit and spaced from the plenum housing.

24. A pneumatic materials conveyance apparatus, comprising:
   a plenum housing having at least one gas inlet;
   a vena-contracta positioned within said plenum housing defined by an annular space formed between the terminal end of a feed conduit and a nozzle positioned about said terminal end of said feed conduit said nozzle being positioned within and spaced from said plenum housing; and
   a processing conduit extending from said plenum housing in axial alignment with said vena-contracta.

25. The pneumatic materials conveyance apparatus of claim 24 wherein said vena-contracta is adjustable.

26. A method of conveying and processing particulate materials through a pneumatic materials conveyance apparatus, comprising:
   providing a pneumatic materials conveyance apparatus having a pneumatic accelerator further comprising of a plenum housing having a plurality of gas inlets, a nozzle positioned in said plenum housing and surrounding the terminal end of a feed conduit and a processing conduit extending from said plenum housing in axial alignment with said feed conduit and nozzle, and having a source of gas positioned to selectively deliver gas to said plurality of gas inlets;
   directing gas from said source of gas through said plurality of gas inlets;
   flowing said gas from said plurality of gas inlets between said plenum housing and said nozzle and into an annular space defined between said terminal end of said feed conduit and said nozzle to selectively increase the velocity of said gas;
   directing particulate materials through said feed conduit to said nozzle;
   mixing said particulate material with said velocitized gas flowing through said annulus to entrain said material therein; and
   directing said entrained particulate material and gas through said processing conduit.

27. The method according to claim 26 wherein said plurality of gas inlets further includes selectively adjustable valves, and wherein said method further comprises selectively adjusting said valves in said plurality of gas inlets while directing gas therethrough.

28. The method according to claim 27, further comprising selectively adjusting said annular space to selectively modify the velocity of gas flowing therethrough.

29. The method according to claim 26 further comprising contacting said particulate materials against an ablative plate upon egress of said particulate materials from the processing conduit.

30. The method according to claim 29 further comprising classifying said particulate materials in accordance with the aerodynamic diameter of each said particle.

31. The method according to claim 29 further comprising drying said particulate material.

* * * * *